(12) United States Patent
Ma et al.

(10) Patent No.: US 11,239,938 B2
(45) Date of Patent: Feb. 1, 2022

(54) INFORMATION TRANSMISSION METHOD AND DEVICE

(71) Applicant: HUAWEI TECHNOLOGIES CO., LTD., Guangdong (CN)

(72) Inventors: Ruixiang Ma, Beijing (CN); Lei Guan, Beijing (CN); Yongxia Lyu, Ottawa (CA); Jiafeng Shao, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/931,571

(22) Filed: May 13, 2020

(65) Prior Publication Data

US 2020/0322080 A1    Oct. 8, 2020

Related U.S. Application Data

(63) Continuation of application No. PCT/CN2018/113090, filed on Oct. 31, 2018.

(30) Foreign Application Priority Data

Nov. 17, 2017   (CN) .......................... 201711147522.4
Jan. 12, 2018   (CN) .......................... 201810032105.3

(51) Int. Cl.
*H04L 1/00*        (2006.01)
*H04W 72/04*    (2009.01)
*H04W 80/08*    (2009.01)

(52) U.S. Cl.
CPC ......... *H04L 1/0006* (2013.01); *H04W 72/042* (2013.01); *H04W 72/0446* (2013.01); *H04W 80/08* (2013.01)

(58) Field of Classification Search
CPC .............. H04L 1/0006; H04W 72/042; H04W 72/0446; H04W 80/08
See application file for complete search history.

(56) References Cited

U.S. PATENT DOCUMENTS

2009/0213782 A1*   8/2009   Yee .......................... H04B 7/212
2016/0212744 A1    7/2016   Lyu
(Continued)

FOREIGN PATENT DOCUMENTS

CN     105099632 A     11/2015
CN     105991251 A     10/2016
(Continued)

OTHER PUBLICATIONS

Catt, Outstanding aspects of slot format indication. 3GPP TSG RAN WG1 Meeting AH_#NR3, Nagoya, Japan, Sep. 18-21, 2017, R1-1715815, 10 pages.
(Continued)

*Primary Examiner* — Ronald B Abelson
(74) *Attorney, Agent, or Firm* — Leydig, Voit & Mayer, Ltd.

(57) ABSTRACT

Embodiments of this application provide slot format configuration method and device. According to the method, a network device determines a slot format index for performing uplink-downlink transmission with a terminal device. The slot format index corresponds to a row in a slot format information table, and each row in the slot format information table includes positions of uplink symbols, positions of downlink symbols, and positions of unknown symbols in a slot. The network device sends the slot format index to the terminal device. The terminal device determines a slot format for the uplink-downlink transmission from the slot format information table based on the slot format index. The uplink-downlink slot configuration method provided in the embodiments of this application may satisfy specific
(Continued)

requirements of low-latency and high-reliability communication scenarios.

16 Claims, 5 Drawing Sheets

(56) References Cited

U.S. PATENT DOCUMENTS

| | | | |
|---|---|---|---|
| 2017/0346604 A1 | 11/2017 | Qu et al. | |
| 2018/0295220 A1 | 10/2018 | Ren et al. | |
| 2018/0324799 A1 | 11/2018 | Li et al. | |

FOREIGN PATENT DOCUMENTS

| | | | |
|---|---|---|---|
| CN | 106465392 A | 2/2017 | |
| CN | 106685603 A | 5/2017 | |
| CN | 106888077 A | 6/2017 | |
| CN | 106982465 A | 7/2017 | |
| CN | 107204951 A | 9/2017 | |
| CN | 107295652 A | 10/2017 | |
| CN | 107306171 A | 10/2017 | |
| CN | 108809614 B9 | 9/2019 | |
| CN | 110582952 A | 12/2019 | |
| EP | 3419360 A1 | 12/2018 | |
| EP | 3605885 A1 | 2/2020 | |
| JP | 2019521602 A | 7/2019 | |
| JP | 2020511897 A | 4/2020 | |
| WO | 2015042843 A1 | 4/2015 | |
| WO | 2017101799 A1 | 6/2017 | |
| WO | 2017111808 A1 | 6/2017 | |

OTHER PUBLICATIONS

NTT Docomo, Inc., Remaining issues on group-common PDCCH. 3GPP TSG RAN WG1 Meeting 90bis, Prague, CZ, Oct. 9-13, 2017, R1-1718205, 10 pages.

3GPP TSG RAN WG1 Meeting 90bis, Remaining details on group-common PDCCH,R1-1717063,Huawei, HiSilicon, Prague, Czech Republic, Oct. 9-13, 2017,pp. 6.

LGE,"WF on SFI",3GPP TSG RAN WG1 #90,R1-1715081,Prague, Czech Republic, 6.1.3.1.4.2, total 2 pages.

3GPP TS 38.211 V1.0.0 (Sep. 2017),3rd Generation Partnership Project;Technical Specification Group Radio Access Network;NR;Physical channels and modulation(Release 15), total 37 pages.

Draft report of 3GPP TSG RAN WG1 #90bis v0.1.0 3GPP, MCC support,dated 2017, pp. 5.

3GPP TS 38.213 V1.0 0 (Sep. 2017),3rd Generation Partnership Project;Technical Specification Group Radio Access Metwork;NR;Physical layer procedures for control(Release 15), total 16 pages.

3GPP TS 38.331 V0.1.0 (Oct. 2017),3rd Generation Partnership Project;Technical Specification Group Radio Access Network;NR-;Radio Resource Control (RRC);Protocol specification(Release 15), total 42 pages.

Oppo, "Discussion of Group Common PDCCH," 3GPP TSG RAN WG1 Meeting NR#9-bis, Prague, CZ, R1-1718044, total 7 pages, 3rd Generation Partnership Project, Valbonne, France (Oct. 9-13, 2017).

Catt, "On semi-static and dynamic signaling of SFI," 3GPP TSG RAN WG1 Meeting #91, Reno, USA, R1-1720192, total 8 pages, 3rd Generation Partnership Project, Valbonne, France (Nov. 27-Dec. 1, 2017).

Ericsson, "On Group-Common PDCCH," 3GPP TSG-RAN WG1 Meeting #90bis, Prague, Czech Republic, R1-1718629, total 8 pages, 3rd Generation Partnership Project, Valbonne, France (Oct. 9-13, 2017).

Intel Corporation, "On group-common PDCCH," 3GPP TSG RAN WG1 Meeting #90bis, Prague, Czech Republic, R1-1717380, total 12 pages, 3rd Generation Partnership Project, Valbonne, France (Oct. 9-13, 2017).

ZTE, Sanechips, "Remaining details on group-common PDCCH," 3GPP TSG RAN WG1 Meeting #90bis, Prague, CZ, R1-1717512, total 7 pages, 3rd Generation Partnership Project, Valbonne, France (Oct. 9-13, 2017).

Ericsson, "On Group-Common PDCCH," 3GPP TSG-RAN WG1 Meeting AH_NR#3, Nagoya, Japan, R1-1716580,total 8 pages, 3rd Generation Partnership Project, Valbonne, France (Sep. 18-21, 2017).

ZTE, Sanechips, "Remaining details on group-common PDCCH," 3GPP TSG RAN WG1 Meeting NR#3, Nagoya, Japan, R1-1715520, total 6 pages, 3rd Generation Partnership Project, Valbonne, France (Sep. 18-21, 2017).

LG Electronics, "Discussion on the contents of group common PDCCH," 3GPP TSG RAN WG1 Meeting #90, Prague, Czech Republic, R1-1713171, total 7 pages (Aug. 2017).

* cited by examiner

INFORMATION TRANSMISSION METHOD AND DEVICE

CROSS-REFERENCE TO RELATED APPLICATIONS

This application is a continuation of International Patent Application No. PCT/CN2018/113090, filed on Oct. 31, 2018, which claims priority to Chinese Patent Application No. 201711147522.4, filed on Nov. 17, 2017, and Chinese Patent Application No. 201810032105.3, filed on Jan. 12, 2018. The disclosures of the aforementioned patent applications are hereby incorporated by reference in their entireties.

TECHNICAL FIELD

This application relates to the field of communication technologies, and in particular, to an information transmission method and device.

BACKGROUND

The new radio (NR) access technology of the fifth generation (5G) mobile communication has gained wide attention and has been extensively studied by the Third Generation Partnership Project (3GPP) and other international standardization organizations. A number of application scenarios of the 5G mobile communication systems (for example ultra-reliable and low-latency communications (URLLC)) have higher requirements, such as higher reliability and lower latency.

In an existing long term evolution (LTE) system, two different duplex modes, namely, frequency division duplex (FDD) and time division duplex (TDD) are defined. In the FDD, uplink and downlink are distinguished by different frequency bands occupied in the uplink and the downlink. In the TDD, uplink and downlink are distinguished by different time domain resources occupied in uplink and downlink. For the TDD, a base station sends uplink-downlink configuration information to a terminal device (may be alternatively referred to as user equipment throughout this application), where the uplink-downlink configuration information is used to indicate an uplink subframe position, a downlink subframe position, and a special subframe position in a frame. The user equipment may receive, on a downlink subframe, downlink information sent by the base station, and send uplink information to the base station on an uplink subframe. A special subframe includes a symbol used for downlink-to-uplink switching.

However, an existing uplink-downlink configuration is not suitable for the URLLC scenario of the 5G communication, and an uplink-downlink configuration suitable for the URLLC scenario has not been developed.

SUMMARY

Embodiments of this application provide an information transmission method and device. An uplink-downlink configuration provided in the method may be applicable to requirements of low-latency and high-reliability scenarios.

According to a first aspect, an embodiment of this application provides an information transmission method, including:

determining, by a network device, slot format information, where the slot format information is used to indicate one or more slot formats, and the slot format include positions of uplink symbols, positions of downlink symbols, and positions of unknown symbols in a slot; an uplink symbol is used to carry uplink information, a downlink symbol is used to carry downlink information, and an unknown symbol is used as a switching gap for downlink-to-uplink switching; and optionally, the slot format information is a slot format index, and the index may indicate at least one row and/or at least one column in a slot format information table; and sending, by the network device, the slot format information.

In this embodiment of this application, a granularity of an uplink-downlink configuration becomes smaller, and the granularity of the uplink-downlink configuration is no longer a subframe, but a smaller time unit, a symbol in a slot. In this way, a time unit used for uplink/downlink information transmission is smaller, and uplink/downlink switching is faster, which helps implementing a low latency.

In a possible design, the sending, by the network device, the slot format information includes:

sending, by the network device, downlink control information, where the downlink control information carries the slot format information; or sending, by the network device, higher layer signaling, where the higher layer signaling carries the slot format information, and the higher layer signaling may be cell-specific higher layer signaling, or may be user equipment-specific higher layer signaling.

In a possible design, before the determining, by a network device, slot format information, the method further includes:

receiving, by the network device, latency requirement information of at least one terminal device from the at least one terminal device.

According to a second aspect, an embodiment of this application provides an information transmission method, including:

receiving, by a terminal device, slot format information from a network device, where the slot format information is used to indicate a slot format, and the slot format includes positions of uplink symbols, positions of downlink symbols, and positions of unknown symbols in a slot; and determining, by the terminal device, the slot format based on the slot format information.

In a possible design, the receiving, by a terminal device, slot format information from a network device includes:

receiving, by the terminal device, downlink control information from the network device, where the downlink control information carries the slot format information; or receiving, by the terminal device, higher layer signaling from the network device, where the higher layer signaling carries the slot format information.

In a possible design, before the receiving, by a terminal device, slot format information from a network device, the method further includes: sending, by the terminal device, latency requirement information to the network device.

According to a third aspect, an embodiment of this application provides an information transmission device, where the information transmission device is a network device, and includes:

a processing module, configured to determine slot format information, where the slot format information is used to indicate positions of uplink symbols, positions of downlink symbols, and positions of unknown symbols in a slot; and a sending module, configured to send the slot format information.

In a possible design, the sending module is specifically configured to:

send downlink control information, where the downlink control information carries the slot format information; or send higher layer signaling, where the higher layer signaling carries the slot format information.

In a possible design, the device further includes a receiving module, where the receiving module is configured to receive latency requirement information of at least one terminal device from the at least one terminal device before the slot format information is determined.

According to a fourth aspect, an embodiment of this application provides an information transmission device, where the information transmission device is a terminal device, and the terminal device includes:

a receiving module, configured to receive slot format information from a network device, where the slot format information is used to indicate positions of uplink symbols, positions of downlink symbols, and positions of unknown symbols in a slot; and a processing module, configured to determine a slot format based on the slot format information.

In a possible design, the receiving module is specifically configured to:

receive downlink control information from the network device, where the downlink control information carries the slot format information; or receive higher layer signaling from the network device, where the higher layer signaling carries the slot format information.

In a possible design, the device further includes a sending module, where the sending module is configured to send latency requirement information to the network device before the slot format information is received from the network device.

According to the first aspect to the fourth aspect and the various possible designs of the first aspect to the fourth aspect, the slot format information is specifically a slot format index, and the slot format index is used to indicate a row in a slot format information table; and each row in the slot format information table is used to indicate positions of uplink symbols, positions of downlink symbols, and positions of unknown symbols in one or more slots.

According to the first aspect to the fourth aspect and the various possible designs of the first aspect to the fourth aspect, the slot format information corresponds to the slot format information table, the slot format information table includes a first slot format, and the first slot format satisfies: the first to eighth symbols start with one or more downlink symbols, and end with one or more uplink symbols, there is at least one unknown symbol between the downlink symbol and the uplink symbol, and the ninth to fourteenth symbols are downlink symbols. To be specific, there is at least one unknown symbol between the last downlink symbol in one or more consecutive downlink symbols and the first uplink symbol in one or more consecutive uplink symbols.

According to the first aspect to the fourth aspect and the various possible designs of the first aspect to the fourth aspect, the first slot format is represented as DDXXXUUUDDDDDD, D represents a downlink symbol, U represents an uplink symbol, and X represents an unknown symbol.

According to the first aspect to the fourth aspect and the various possible designs of the first aspect to the fourth aspect, the slot format information table is prestored.

According to the first aspect to the fourth aspect and the various possible designs of the first aspect to the fourth aspect, the slot format indicated by the slot format information may be: there are two unknown symbols in the first six symbols in the slot, and the seventh symbol in the slot is an uplink symbol; and the eighth symbol in the slot is a downlink symbol.

According to the first aspect to the fourth aspect and the various possible designs of the first aspect to the fourth aspect, the ninth to fourteenth symbols in the slot are downlink symbols.

According to the first aspect to the fourth aspect and the various possible designs of the first aspect to the fourth aspect, the slot format information indicates one or more slot formats, or the slot format information indicates one or more slot formats in the slot format information table. The following provides possible implementations of the slot format. It may be alternatively understood that the slot format information table may include one or more of the following slot formats: in the slot, the first symbol is a downlink symbol, the second symbol is an unknown symbol, the third symbol is an uplink symbol, the fourth symbol is a downlink symbol, the fifth symbol is an unknown symbol, and the sixth symbol is an uplink symbol;

in the slot, the first symbol is a downlink symbol, the second symbol is a downlink symbol, the third symbol is an unknown symbol, the fourth symbol is an uplink symbol, the fifth symbol is a downlink symbol, and the sixth symbol is an unknown symbol;

in the slot, the first symbol is a downlink symbol, the second symbol is an unknown symbol, the third symbol is an uplink symbol, the fourth symbol is a downlink symbol, the fifth symbol is a downlink symbol, and the sixth symbol is an unknown symbol;

in the slot, the first symbol is an unknown symbol, the second symbol is an uplink symbol, the third symbol is an uplink symbol, the fourth symbol is a downlink symbol, the fifth symbol is an unknown symbol, and the sixth symbol is an uplink symbol;

in the slot, the first symbol is an unknown symbol, the second symbol is an uplink symbol, the third symbol is a downlink symbol, the fourth symbol is a downlink symbol, the fifth symbol is an unknown symbol, and the sixth symbol is an uplink symbol; and in the slot, the first symbol is an unknown symbol, the second symbol is an uplink symbol, the third symbol is a downlink symbol, the fourth symbol is an unknown symbol, the fifth symbol is an uplink symbol, and the sixth symbol is an uplink symbol.

According to the first aspect to the fourth aspect and the various possible designs of the first aspect to the fourth aspect, the slot format indicated by the slot format information may be: there are two unknown symbols in the first to seventh symbols in the slot, and the ninth to fourteenth symbols in the slot are downlink symbols; or the first to sixth symbols in the slot are downlink symbols, and there are one or two unknown symbols in the seventh to fourteenth symbols in the slot; or there is one unknown symbol in the first to seventh symbols in the slot, and there is one unknown symbol in the eighth to fourteenth symbols in the slot.

According to the first aspect to the fourth aspect and the various possible designs of the first aspect to the fourth aspect, the slot format information indicates the one or more slot formats; or the slot format information indicates the one or more slot formats in the slot format information table, and the slot format information table may include one or more slot formats.

According to the first aspect to the fourth aspect and the various possible designs of the first aspect to the fourth aspect, a first subcarrier is used to transmit uplink information carried on the uplink symbol and downlink information carried on the downlink symbol; and a subcarrier spacing of the first subcarrier is greater than or equal to a subcarrier spacing of a second subcarrier, and the second subcarrier is used to transmit a synchronization block sent by the network device.

According to the first aspect to the fourth aspect and the various possible designs of the first aspect to the fourth aspect, the unknown symbol is a flexible symbol.

According to a fifth aspect, an embodiment of this application further provides a network device, including a memory and a processor, where the memory is configured to store a program instruction; and the processor is configured to invoke the program instruction stored in the memory to implement the foregoing information transmission method performed by the network device.

According to a sixth aspect, an embodiment of this application further provides a terminal device, including a memory and a processor, where the memory is configured to store a program instruction; and the processor is configured to invoke the program instruction stored in the memory to implement the foregoing information transmission method performed by the terminal device.

According to a seventh aspect, an embodiment of this application further provides a computer storage medium, where the storage medium includes an instruction, and when the instruction is executed by a computer, the computer is enabled to perform the information transmission method according to the first aspect and the various possible designs of the first aspect.

According to an eighth aspect, an embodiment of this application further provides a computer storage medium, where the storage medium includes an instruction, and when the instruction is executed by a computer, the computer is enabled to perform the information transmission method according to the second aspect and the various possible designs of the second aspect.

According to a ninth aspect, an embodiment of this application further provides a chip, including a memory and a processor, where the memory is configured to store a program instruction; and the processor is configured to invoke the program instruction stored in the memory to perform the information transmission method according to the first aspect and the various possible designs of the first aspect.

According to a tenth aspect, an embodiment of this application further provides a chip, including a memory and a processor, where the memory is configured to store a program instruction; and the processor is configured to invoke the program instruction stored in the memory to perform the information transmission method according to the second aspect and the various possible designs of the second aspect.

According to an eleventh aspect, an embodiment of this application further provides a program product, where the program product includes a computer program, the computer program is stored in a readable storage medium, at least one processor of a network device may read the computer program from the readable storage medium, and the at least one processor executes the computer program, so that the network device performs the foregoing information transmission method.

According to a twelfth aspect, an embodiment of this application further provides a program product, where the program product includes a computer program, the computer program is stored in a readable storage medium, at least one processor of a terminal device may read the computer program from the readable storage medium, and the at least one processor executes the computer program, so that the terminal device performs the foregoing information transmission method.

According to a thirteenth aspect, an embodiment of this application provides a communications apparatus, including a processor and a communications interface, where the processor is configured to support the communications apparatus in performing the information transmission method according to the first aspect and the various possible designs of the first aspect, and the communications interface is configured to support communication between the communications apparatus and another communications device.

According to a fourteenth aspect, an embodiment of this application provides a communications apparatus, including a processor and a communications interface, where the processor is configured to support the communications apparatus in performing the information transmission method according to the second aspect and the various possible designs of the second aspect, and the communications interface is configured to support communication between the communications apparatus and another communications device.

According to the information transmission method and device provided in the embodiments of this application, the network device determines and sends the slot format information, and the terminal device receives the slot format information from the network device, where the slot format information is used to indicate positions of uplink symbols, positions of downlink symbols, and positions of unknown symbols in the slot. The terminal device determines the slot format based on the slot format information. After receiving scheduling information, the terminal device may send the uplink information to the network device and receive the downlink information from the network device, so that a granularity of an uplink-downlink configuration is refined from a subframe to a symbol in a slot, and a requirement of the terminal device for a low latency is met.

DETAILED DESCRIPTION OF EMBODIMENTS

Figure 1:
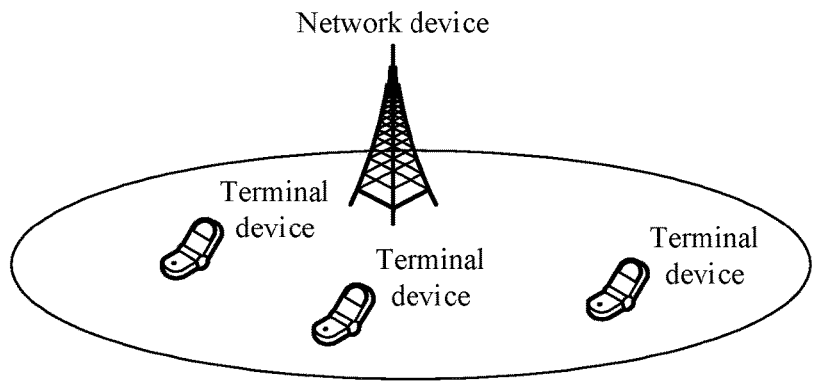
FIG. 1 is a schematic diagram of a communication system.

FIG. 1 is a schematic diagram of a communication system. The communication system includes a network device and a number of terminal device. The communication system may be an LTE communications system, or may be another future communication system such as a 5G communication system. This is not limited herein.

The network device may be a device that connects the terminal device to a wireless network. The device may be a base station or a radio access point, or may be a device that communicates with the terminal device over an air interface by using one or more sectors in an access network. The base station may be configured to perform conversion between a received over-the-air frame and an IP packet and serve as a router between the terminal device and a remaining part of the access network, where the remaining part of the access network may include an Internet protocol (IP) network. The base station may further coordinate attribute management of the air interface. For example, the base station may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in long term evolution (LTE), a relay node or an access point, a gNodeB gNB in a future 5G network, or the like. This is not limited herein.

The terminal device may be a wireless terminal or a wired terminal. The wireless terminal may be a device that provides a user equipment with voice and/or other service data connectivity, a handheld device with a wireless connection function, or another processing device connected to a wireless modem. The wireless terminal may communicate with one or more core networks through a radio access network. The wireless terminal may be a mobile terminal such as a mobile phone (or referred to as a "cellular" phone), or a computer with a mobile terminal, for example, a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile station, a remote station, a remote terminal (Remote Terminal), an access terminal, a user terminal, a user agent, or user equipment. This is not limited herein.

In the 5G communications system, three typical scenarios include enhanced mobile broadband (eMBB), massive machine-type communications, and ultra-reliable and low-latency communications (URLLC). Application scenarios corresponding to the URLLC include unmanned driving, industrial control, and the like. The application scenarios raise stricter requirements for reliability and a latency.

Specific requirements of the URLLC scenario include transmission reliability of 99.999% and a transmission latency less than 1 millisecond (ms). Regardless of the reliability, an average transmission latency is required to be within 0.5 ms. Therefore, embodiments of this application provide an information transmission method. In this method, an uplink-downlink configuration is properly designed to meet the requirements of the URLLC for a low latency and ultra-high reliability.

Figure 2:
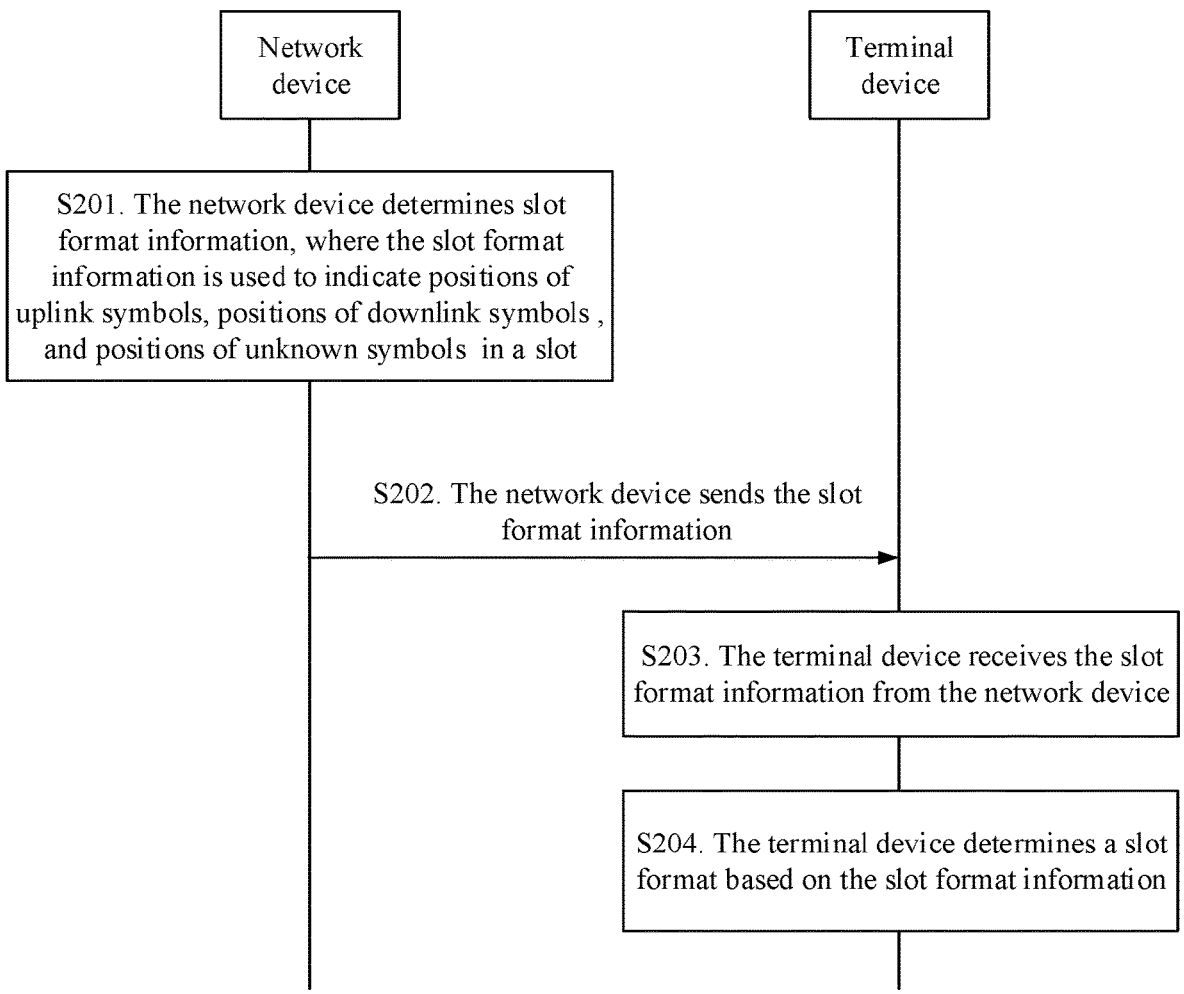
FIG. 2 is a signaling flowchart of an information transmission method according to an embodiment of this application.

FIG. 2 is a signaling flowchart of an information transmission method according to an embodiment of this application. As shown in FIG. 2, the method includes the following steps.

S201. A network device determines slot format information, where the slot format information is used to indicate positions of uplink symbols, positions of downlink symbols, and positions of unknown symbols in a slot.

In a URLLC scenario or when a terminal device has a requirement for a low latency, the network device determines slot format information. Optionally, when the terminal device has the requirement for a low latency, the terminal device sends latency requirement information to the network device. Correspondingly, the network device may receive the latency requirement information of at least one terminal device from the at least one terminal device. The terminal device may report the latency requirement information to the network device through a physical uplink control channel (PUCCH) or a physical uplink shared channel (PUSCH). The latency requirement information is used to indicate a transmission latency, and the transmission latency may be a maximum transmission latency, a minimum transmission latency, or an average transmission latency.

Specifically, the network device may determine a slot format, namely, positions of uplink symbols, positions of downlink symbols, and positions of unknown symbols in a slot, based on a requirement of the URLLC scenario and/or the requirement of the terminal device for a latency, and then determine the slot format information used to indicate the slot format. The slot format information may indicate one slot format, or may indicate a plurality of slot formats. This embodiment imposes no special limitation on a quantity of slot formats indicated by the slot format information.

In this embodiment of this application, a granularity of an uplink-downlink configuration becomes smaller, and the granularity of the uplink-downlink configuration is no longer a subframe, but a smaller time unit, a symbol in a slot. In this way, a time unit used for uplink/downlink information transmission is smaller, and uplink/downlink switching is faster, which helps implementing a low latency. This embodiment of this application imposes no special limitation on an algorithm or a rule used by the network device to determine positions of uplink symbols, positions of downlink symbols, and positions of unknown symbols in a slot.

The slot format information may also be referred to as slot format related information (SFI), or may also be referred to as slot information, a slot format, or the like. This embodiment imposes no special limitation on a name of information used to indicate positions of uplink symbols, positions of downlink symbols, and positions of unknown symbols in a slot, and any name shall fall within the protection scope of this application.

In 5G mobile communication, it is defined that one slot includes 14 symbols. A symbol may be an orthogonal frequency division multiplexing (OFDM) symbol, or another kind of symbol used in a 5G system. The 14 symbols may include downlink symbols used to transmit downlink information, unknown symbols, and uplink symbols used to transmit uplink information.

The slot is a time period in time domain, and may be a basic time unit for resource scheduling. It is defined that one slot includes 14 symbols, and symbols corresponding to different subcarrier spacings are different in duration. Therefore, different subcarrier spacings correspond to slots with different duration. The subcarrier spacing is a frequency domain interval between two subcarrier peaks, and may be $\Delta f$, or may be represented by numerology. The numerology includes concepts of subcarrier spacing and cyclic prefix (CP) length parameter. A same numerology means a same subcarrier spacing and a same CP length. When a subcarrier spacing is 15 kHz, a corresponding duration of a slot is 1 ms. When a subcarrier spacing is 30 kHz, a corresponding duration of a slot is 0.5 ms. When a subcarrier spacing is 60 kHz, a corresponding duration of a slot is 0.25 ms. Further, 15 kHz is used as an example. Duration of one radio frame is 10 ms, one radio frame has 10 subframes, and duration of one subframe is 1 ms. In other words, the duration of one subframe is the same as duration of one slot. However, one slot includes 14 symbols. It can be learned that a time granularity of the symbol is far smaller than a time granularity of the subframe.

The uplink information may include uplink data and/or uplink control information. The downlink information may include downlink data and/or downlink control information. An unknown symbol is a flexible symbol, and may be used as a switching gap for downlink-to-uplink switching, or may be used as a reserved resource, or may be used as a gap symbol. The unknown symbol may be overwritten by other signaling. For example, a symbol was defined as an unknown symbol. If a user equipment receives signaling having a higher priority than the slot format information, the symbol may be overwritten to an uplink symbol or a downlink symbol. In this embodiment of this application, the unknown symbol may be used as a switching point for an uplink symbol and a downlink symbol. Specifically, it takes a given intermediate time for the terminal device to change from receiving downlink information from the network device to sending uplink information to the network device. The intermediate time is an uplink/downlink switching point, and the intermediate time may be equal to duration of the unknown symbol.

Based on the foregoing embodiment, the slot format information may include a specific slot format, namely, positions of uplink symbols, positions of downlink symbols, and positions of unknown symbols.

The slot format information may be further a slot format index. The network device may send one slot format index to the terminal device, or may send a plurality of slot format indexes. This is not specially limited in this embodiment. There is a correspondence between the slot format index and positions of uplink symbols, positions of downlink symbols, and positions of unknown symbols in a slot. The correspondence may be implemented by using any of a mapping relationship, a functional relationship, and a table that are known by the network device and the terminal device. The slot format index may also be referred to as a format index, a slot index, or the like. This embodiment imposes no special limitation on a name of the index.

In a specific example, when the correspondence is implemented based on a table, the table records positions of uplink symbols, positions of downlink symbols, and positions of unknown symbols.

The table may include a plurality of rows, each row is used to indicate positions of uplink symbols, positions of downlink symbols, or positions of unknown symbols in one or more slots, and the index may be specifically a row number used to indicate a row in the table.

The table may alternatively include a plurality of columns, each column is used to indicate positions of uplink symbols, positions of downlink symbols, or positions of unknown symbols in one or more slots, and the index may be specifically a column number used to indicate a column in the table.

The foregoing describes only some implementations of the table. During specific implementation, the table may be further implemented in another manner. All implementations using a table fall within the protection scope of this application, and are not enumerated in this embodiment.

S202. The network device sends the slot format information.

After the network device determines the slot format information, the network device may send the slot format information to all terminal devices in a cell in a broadcast manner, or may send the slot format information to a group of terminal devices in a multicast manner, or may send the slot format information to a terminal device in a unicast manner.

In a specific implementation process, the network device may send downlink control information (DCI) to a group of terminal devices. The downlink control information may be referred to as group common downlink control information (Group Common DCI), or the DCI may be scrambled by using a related identifier of slot format information (SFI-Radio Network Temporary Identifier, SFI-RNTI). The DCI carries the slot format information. Alternatively, the network device may send higher layer signaling. The higher layer signaling carries the slot format information. The higher layer signaling may be cell-specific higher layer signaling, or may be user equipment-specific higher layer signaling. This embodiment imposes no special limitation on a specific implementation of the higher layer signaling.

S203. The terminal device receives the slot format information from the network device.

The terminal device may receive the slot format information that is sent by the network device in a broadcast, multicast, or unicast manner.

In correspondence with S202, the terminal device receives the DCI from the network device, and obtains the slot format information form the DCI. The terminal device may alternatively receive the higher layer signaling from the network device, and obtains the slot format information form the higher layer signaling.

S204. The terminal device determines the slot format based on the slot format information.

After obtaining the slot format information, the terminal device determines, according to the indication of the slot format information, the slot format, namely, positions of uplink symbols, positions of downlink symbols, and positions of unknown symbols in the slot.

Specifically, it can be learned from the description of S201 that the slot format information may include the specific uplink symbol positions, the specific downlink symbol positions, and the specific unknown symbol positions. The slot format information may be further a slot format index. There is the correspondence between the slot format index and positions of uplink symbols, positions of downlink symbols, and positions of unknown symbols in a slot. The correspondence may be implemented by using a mapping relationship, a functional relationship, and a table that are known by the network device and the terminal device. Therefore, the terminal device may obtain the specific uplink symbol position, the specific downlink symbol position, and the specific unknown symbol position based on the slot format index.

After positions of the uplink symbols, positions of the downlink symbols, and positions of the unknown symbols are obtained, if uplink scheduling information is received, the terminal device sends uplink information to the network device on an uplink symbol; or if downlink scheduling information is received, the terminal device receives downlink information from the network device on a downlink symbol. The uplink information includes uplink control information, uplink data information, and the like, and the downlink information includes downlink control information, downlink data information, and the like. The unknown symbol may be used as a switching point at which the terminal device changes from receiving the downlink information to sending the uplink information to the network device.

According to the information transmission method provided in this embodiment of this application, the network device determines and sends the slot format information, and the terminal device receives the slot format information from the network device, where the slot format information is used to indicate positions of uplink symbols, positions of downlink symbols, and positions of unknown symbols in the slot. The terminal device determines the slot format based on the slot format information. After receiving scheduling information, the terminal device may send the uplink information to the network device and receive the downlink information from the network device, so that a granularity of an uplink-downlink configuration is refined from a subframe to a symbol in a slot, and a requirement of the terminal device for a low latency is met.

Based on the foregoing embodiment, the embodiments of this application may be further applied to a scenario of frequency division multiplexing (FDM). In the scenario of FDM that is performed by using a synchronization data block and a normal uplink/downlink information block of a user equipment, a first subcarrier is used to transmit uplink information carried on an uplink symbol and/or downlink information carried on a downlink symbol. The uplink information includes uplink control information, uplink data information, or the like. Likewise, the downlink information includes downlink control information, downlink data information, and the like. A second subcarrier is used to transmit a synchronization block (SS block) sent by the network device, or a synchronization data block sent by the network device, or a synchronization information block sent by the network device. In other words, a frequency resource occupied for transmitting the uplink information or the downlink information is different from a frequency resource for transmitting the synchronization block. To meet the requirement of the terminal device for a low latency, a subcarrier spacing of the first subcarrier is greater than or equal to a subcarrier spacing of the second subcarrier. The subcarrier spacing of the first subcarrier is greater than or equal to 30 kHz, and the subcarrier spacing of the second subcarrier is less than or equal to 30 kHz. To be specific, when the spacing of the second subcarrier is 15 kHz or 30 kHz, the spacing of the first subcarrier may be 30 kHz, 60 kHz, or the like.

In a specific implementation process, when the terminal device accesses the network device, synchronization between the terminal device and the network device needs to be completed. The synchronization means that the terminal device and the network device are synchronized in time and frequency. To complete synchronization, the network device needs to transmit a synchronization block, which may be alternatively understood as a synchronization signal or synchronization information, on a downlink. The terminal device completes synchronization with the network device based on the synchronization block. Details about a specific synchronization process are not described in this embodiment.

In this embodiment of this application, an example in which the second subcarrier of the second carrier is 15 kHz or 30 kHz is used to describe a position occupied by the synchronization block in a slot.

Figure 3:
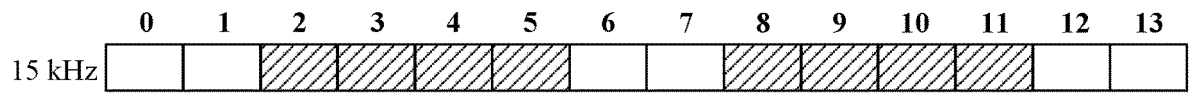
FIG. 3 is a schematic diagram of a synchronization block configuration according to an embodiment of this application.

As shown in FIG. 3, when the spacing of the second subcarrier is 15 kHz, the synchronization block occupies symbols shown as shadow parts in the figure. To be specific, the synchronization block occupies the third to the sixth symbols (whose sequence numbers are 2, 3, 4, and 5) in one slot, and the ninth to twelfth symbols (whose sequence numbers are 8, 9, 10, and 11).

Figure 4:
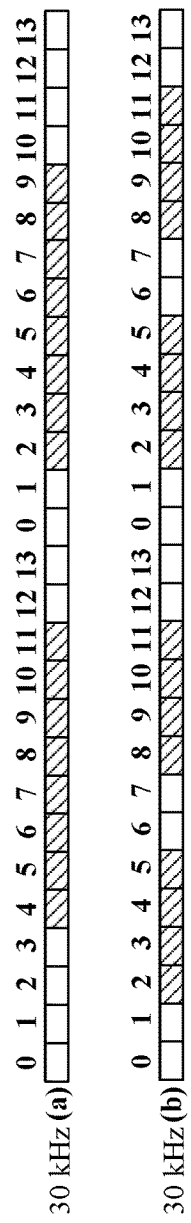
FIG. 4 is a schematic diagram of a synchronization block configuration according to another embodiment of this application.

As shown in FIG. 4, when the spacing of the second subcarrier spacing is 30 kHz, there are two cases of the position of the synchronization block. One case is shown as 30 kHz (a) in FIG. 4, and the other case is shown as 30 kHz (b). In FIG. 4, the synchronization block occupies symbols shown as shadow parts in the figure. For a specific occupation case, refer to FIG. 4. Details are not described in this embodiment.

The synchronization block is sent by the network device to the terminal device for synchronization by using a downlink, and the symbols occupied by the synchronization block are downlink symbols. When the network device transmits information to the terminal device in a frequency division multiplexing manner, to reduce interference, the symbols corresponding to the information and the synchronization block in time domain may be also downlink symbols, as shown in FIG. 5.

Figure 5:
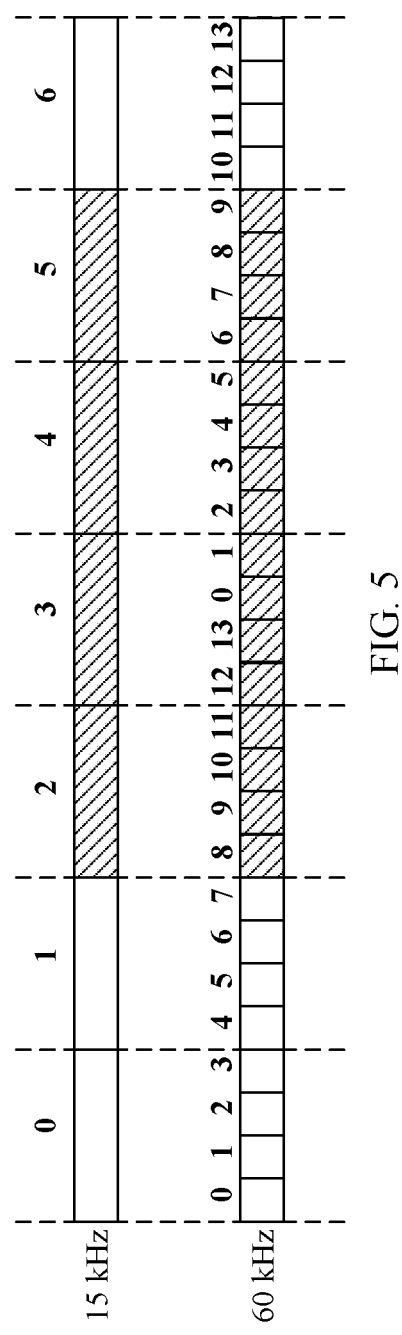
FIG. 5 is a schematic diagram of frequency division multiplexing performed by using an uplink/downlink information block and a synchronization block that have different subcarrier spacings according to an embodiment of this application.

FIG. 5 is a schematic diagram of frequency division multiplexing performed by using an uplink/downlink information block and a synchronization block that have different subcarrier spacings according to an embodiment of this application. A second subcarrier with a subcarrier spacing of 15 kHz is used to transmit the synchronization block, and a first subcarrier with a subcarrier spacing of 60 kHz is used to transmit uplink and/or downlink information. When the subcarrier spacing is 15 kHz, duration of one slot is 1 ms. When the subcarrier spacing is 60 kHz, the duration of one slot is 0.25 ms. Therefore, as shown in FIG. 5, duration, of one symbol, corresponding to the subcarrier spacing of 15 kHz is the same as duration, of four symbols, corresponding to the subcarrier spacing of 60 kHz.

Therefore, as shown in FIG. 5, to reduce interference, when the subcarrier spacing is 15 kHz, the synchronization block occupies the third to sixth symbols (which are shown as shadow parts in the figure and whose sequence numbers are 2, 3, 4, and 5); and when the subcarrier spacing is 60 kHz, shadow parts shown in the figure need to be downlink symbols.

A schematic diagram of frequency division multiplexing performed by using a synchronization block with a subcarrier spacing of 15 kHz and uplink/downlink information block with a subcarrier spacing of 30 kHz, a schematic diagram of frequency division multiplexing performed by using a synchronization block with a subcarrier spacing of 30 kHz and uplink/downlink information block with a subcarrier spacing of 60 kHz, and a schematic diagram of frequency division multiplexing performed by using a synchronization block with another subcarrier spacing and an uplink/downlink information block with another subcarrier spacing are similar to the foregoing figures. Details are not described in this embodiment.

In this embodiment, considering the foregoing cases and a requirement of a

URLLC scenario for a low latency in 5G; when an average latency is 0.5 ms, two switching points are required in 0.5 ms. However, in the prior art, there is no uplink-downlink configuration that meets both a requirement for reducing interference when the frequency division multiplexing is performed by using a synchronization data block and an normal uplink/downlink information block and the requirement of the URLLC scenario for a low latency.

The following describes, by using a plurality of specific solutions, an uplink-downlink configuration provided in this embodiment of this application when the requirement for a low latency and the requirement for reducing interference are met.

Solution 1

When a subcarrier spacing of a first subcarrier is at least 60 kHz, and a subcarrier spacing of a second subcarrier is 15 kHz or 30 kHz, considering compatibility with the prior art (to be specific, the seventh symbol in one slot is an uplink symbol and the eighth symbol is a downlink symbol), there are two unknown symbols in the first six symbols in one slot, and optionally, the ninth to fourteenth symbols in one slot are downlink symbols.

For ease of description, specific implementation of the uplink-downlink configuration is described in detail with reference to a table in this embodiment. A slot format information table in this solution is shown in Table 1.

TABLE 1

|   | 0 | 1 | 2 | 3 | 4 | 5 | 6 | 7 | 8 | 9 | 10 | 11 | 12 | 13 |
|---|---|---|---|---|---|---|---|---|---|---|----|----|----|----|
| 1 | D | G | U | D | G | U | U | D | D | D | D  | D  | D  | D  |
| 2 | D | D | G | U | D | G | U | D | D | D | D  | D  | D  | D  |
| 3 | D | G | U | D | D | G | U | D | D | D | D  | D  | D  | D  |
| 4 | G | U | U | D | G | U | U | D | D | D | D  | D  | D  | D  |
| 5 | G | U | D | D | G | U | U | D | D | D | D  | D  | D  | D  |
| 6 | G | U | D | G | U | U | U | D | D | D | D  | D  | D  | D  |

As shown in Table 1, one row in Table 1 indicates 14 symbols in one slot. D represents a downlink symbol, G represents an unknown symbol, and U represents an uplink symbol. The downlink symbol, the uplink symbol, and the unknown symbol may be further represented by other letters. For example, the unknown symbol may be denoted as Un. The leftmost column in Table 1 indicates sequence numbers of rows, and the top row in Table 1 indicates sequence numbers of symbols. The sequence numbers of the symbols in this embodiment start with 0 and end with 13, and the sequence numbers of the symbols may alternatively start with 1 and end with 14. A method for numbering the symbols is not specifically limited in this embodiment.

As shown in Table 1, slot format information is used to indicate one or more of the following:

in one slot, the first symbol is a downlink symbol, the second symbol is a downlink symbol, the third symbol is an uplink symbol, the fourth symbol is a downlink symbol, the fifth symbol is an unknown symbol, the sixth symbol is an uplink symbol, the seventh symbol is an uplink symbol, the eighth symbol is a downlink symbol, and the ninth to fourteenth symbols are downlink symbols (in the first row);

in one slot, the first symbol is a downlink symbol, the second symbol is a downlink symbol, the third symbol is an unknown symbol, the fourth symbol is an uplink symbol, the fifth symbol is a downlink symbol, the sixth symbol is an unknown symbol, the seventh symbol is an uplink symbol, the eighth symbol is a downlink symbol, and the ninth to fourteenth symbols are downlink symbols (in the second row);

in one slot, the first symbol is a downlink symbol, the second symbol is an unknown symbol, the third symbol is an uplink symbol, the fourth symbol is a downlink symbol, the fifth symbol is a downlink symbol, and the sixth symbol is an unknown symbol, the seventh symbol is an uplink symbol, the eighth symbol is a downlink symbol, and the ninth to fourteenth symbols are downlink symbols (in the third row);

in one slot, the first symbol is an unknown symbol, the second symbol is an uplink symbol, the third symbol is an uplink symbol, the fourth symbol is a downlink symbol, the fifth symbol is an unknown symbol, the sixth symbol is an uplink symbol, the seventh symbol is an uplink symbol, the eighth symbol is a downlink symbol, and the ninth to fourteenth symbols are downlink symbols (in the fourth row);

in one slot, the first symbol is an unknown symbol, the second symbol is an uplink symbol, the third symbol is a downlink symbol, the fourth symbol is a downlink symbol, the fifth symbol is an unknown symbol, the sixth symbol is an uplink symbol, the seventh symbol is an uplink symbol, the eighth symbol is a downlink symbol, and the ninth to fourteenth symbols are downlink symbols (in the fifth row); and in one slot, the first symbol is an unknown symbol, the second symbol is an uplink symbol, the third symbol is a downlink symbol, the fourth symbol is an unknown symbol, the fifth symbol is an uplink symbol, the sixth symbol is an uplink symbol, the seventh symbol is an uplink symbol, the eighth symbol is a downlink symbol, and the ninth to fourteenth symbols are downlink symbols (in the sixth row).

For a network device and a terminal device, the slot format information table may be known and prestored. When the slot format information is a slot format index, the slot format index is used to indicate a row in the slot format information table. For example, the slot format index may indicate a sequence number of a row. For example, if the index is binary, when the index is 001, the first row may be indicated; when the index is 010, the second row may be indicated; when the index is 011, the third row may be indicated; and so on. Sequence numbers of rows may alternatively start with 0.

A table in an actual application needs to meet not only a requirement of a low latency service, but also requirements of another type of service and another type of feature. Therefore, the table in an actual application may include one or more rows, or all rows in Table 1. A base station may properly select some rows in the table to configure a slot format, according to a scheduling algorithm and/or based on a requirement of the terminal device.

Specific rows, in Table 1, selected for the table in an actual application are not specifically limited in this embodiment. In a specific implementation process, the network device may determine the slot format information from the table in an actual application, to meet a requirement of reducing interference and a requirement of a low latency. For a selection rule or a selection algorithm of the network device, details are not described in this embodiment.

For example, the subcarrier spacing of the first subcarrier is 60 kHz, and it can be learned that duration of a slot is 0.25 ms. When there are two unknown symbols in the first six symbols in one slot, two switching points exist in 0.125 ms, so that the requirement for a low latency can be met. The following describes, for each row in the table, a manner in which the design of the first six symbols can meet the requirement for a low latency. The following uses an example in which downlink information is downlink data, and uplink information is uplink data for description. An example in which the downlink information is downlink control information, and uplink information is uplink control information is similar, and details are not described in this embodiment.

In the first row in Table 1, the first symbol is a downlink symbol, and may be used to carry scheduled downlink data of the URLLC. Then, after one symbol, an acknowledgment (ACK) and a negative acknowledgment (NACK) corresponding to the data may be fed back. If the downlink data is correctly received, it takes only a time of three symbols from receiving the data to feeding back the ACK, so that a requirement of a URLLC service for a latency is met. Even if the data fails to be received, the downlink data may continue to be scheduled, and the entire process is completed within six symbols. Therefore, the requirement for a latency can be met.

In the second row in Table 1, the first two symbols are downlink symbols, and may be used to carry a relatively large packet of URLLC data compared with URLLC data carried by the first symbol which is a downlink symbol in the first row. Then there are two switching points in the first six symbols and one initial transmission and one retransmission may be implemented. Not only the requirement for a latency can be met, but also a requirement of reliability is satisfied In the third row in Table 1, the first symbol is a downlink symbol, which is the same as that in the first row, and a low latency of initial service transmission can be ensured. The fourth symbol and the fifth symbol are downlink symbols, which facilitates not only scheduling of a large data packet but also usage of a lower bit rate and occupation of a larger resource for retransmission in a case in which first transmission of scheduled data fails, thereby improving reliability. In addition, initial transmission and retransmission are performed within six symbols, and a latency is far less than 0.5 ms, thereby meeting the requirement for a low latency.

In the fourth row in Table 1, the first symbol is an unknown symbol, and the second and third symbols are for uplink, which not only helps performing, as soon as possible, uplink feedback of downlink data transmitted on the end few symbols of a last slot, but also facilitates transmission of an uplink URLLC service as soon as possible, thereby ensuring reliability of the uplink URLLC service. The fourth symbol is a downlink symbol. Even if downlink URLLC data is to be received on the first symbol, the data needs to wait for only three symbols for transmission, thereby meeting the requirement for a low latency.

The fifth row and the sixth row in Table 1 are the same as the fourth row. In the first six symbols, there are more uplink symbols than downlink symbols. As described above, a requirement of uplink data transmission for a latency can be met, and a latency of downlink data transmission is not affected.

The ninth to fourteenth symbols are downlink symbols. When frequency division multiplexing is performed by using an uplink/downlink information block and an SS block, it is ensured that a symbol occupied by the SS block is a downlink symbol, to avoid that a user equipment transmits uplink information on a corresponding symbol, thereby reducing interference.

Solution 2

When a subcarrier spacing of a first subcarrier is at least 30 kHz, for example, may be 30 kHz or 60 kHz, and a subcarrier spacing of a second subcarrier is not more than 30 kHz, for example, 15 kHz or 30 kHz, when there is no need to be compatible with existing symbol position, the ninth to fourteenth symbols in a slot are downlink symbols, and there are two unknown symbols in the first to seventh symbols in the slot; or the first to sixth symbols in the slot are downlink symbols, and there are one or two unknown symbols in the seventh to fourteenth symbols in the slot; or there is one unknown symbol in the first to seventh symbols in the slot, and there is one unknown symbol in the eighth to fourteenth symbols in the slot. For ease of description, the following gives a detailed description with reference to Table 2 to Table 4. In the following Table 2 to Table 4, meanings of D, U, and G are the same as the meanings of D, U, and G in Table 1, and details are not described in this embodiment again.

In a possible implementation, as shown in Table 2, the ninth to fourteenth symbols in the slot are downlink symbols, and there are two unknown symbols in the first to seventh symbols in the slot. The following uses rows as examples for description. Descriptions of other rows are similar, and details are not described in this embodiment.

TABLE 2

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 1  | D | D | D | G | U | D | G | U | D | D | D  | D  | D  | D  |
| 2  | D | D | G | U | U | D | G | U | D | D | D  | D  | D  | D  |
| 3  | D | D | G | U | D | D | G | U | D | D | D  | D  | D  | D  |
| 4  | D | D | G | U | D | G | U | D | D | D | D  | D  | D  | D  |
| 5  | D | G | U | U | U | D | G | U | D | D | D  | D  | D  | D  |
| 6  | D | G | U | U | D | D | G | U | D | D | D  | D  | D  | D  |
| 7  | D | G | U | U | D | G | U | U | D | D | D  | D  | D  | D  |
| 8  | D | G | U | D | D | D | G | U | D | D | D  | D  | D  | D  |
| 9  | D | G | U | D | D | G | U | U | D | D | D  | D  | D  | D  |
| 10 | D | G | U | D | G | U | U | U | D | D | D  | D  | D  | D  |
| 11 | D | G | U | D | G | U | U | D | D | D | D  | D  | D  | D  |
| 12 | D | G | U | D | G | U | D | D | D | D | D  | D  | D  | D  |
| 13 | G | U | U | U | D | D | G | U | D | D | D  | D  | D  | D  |
| 14 | G | U | U | U | D | G | U | U | D | D | D  | D  | D  | D  |
| 15 | G | U | U | U | U | D | G | U | D | D | D  | D  | D  | D  |
| 16 | G | U | U | D | D | D | G | U | D | D | D  | D  | D  | D  |
| 17 | G | U | U | D | D | G | U | U | D | D | D  | D  | D  | D  |
| 18 | G | U | U | D | G | U | U | U | D | D | D  | D  | D  | D  |
| 19 | G | U | U | D | G | U | U | D | D | D | D  | D  | D  | D  |
| 20 | G | U | U | D | G | U | D | D | D | D | D  | D  | D  | D  |
| 21 | G | U | D | D | D | D | G | U | D | D | D  | D  | D  | D  |
| 22 | G | U | D | D | D | G | U | U | D | D | D  | D  | D  | D  |
| 23 | G | U | D | D | G | U | U | U | D | D | D  | D  | D  | D  |
| 24 | G | U | D | D | G | U | U | D | D | D | D  | D  | D  | D  |
| 25 | G | U | D | D | G | U | D | D | D | D | D  | D  | D  | D  |
| 26 | G | U | D | G | U | U | U | U | D | D | D  | D  | D  | D  |
| 27 | G | U | D | G | U | U | U | D | D | D | D  | D  | D  | D  |
| 28 | G | U | D | G | U | U | D | D | D | D | D  | D  | D  | D  |
| 29 | G | U | D | G | U | D | D | D | D | D | D  | D  | D  | D  |

As shown in Table 2, slot format information is used to indicate one or more of the following:

in one slot, the first to third symbols are downlink symbols, the fourth symbol is an unknown symbol, the fifth symbol is an uplink symbol, the sixth symbol is a downlink symbol, the seventh symbol is an unknown symbol, the eighth symbol is an uplink symbol, and the ninth to fourteenth symbols are downlink symbols (in the first row);

in one slot, the first to second symbols are downlink symbols, the third symbol is an unknown symbol, the fourth to fifth symbols are uplink symbols, the sixth symbol is a downlink symbol, the seventh symbol is an unknown symbol, the eighth symbol is an uplink symbol, and the ninth to fourteenth symbols are downlink symbols (in the second row);

in one slot, the first to second symbols are downlink symbols, the third symbol is an unknown symbol, the fourth symbol is an uplink symbol, the fifth to sixth symbols are downlink symbols, the seventh symbol is an unknown symbol, the eighth symbol is an uplink symbol, and the ninth to fourteenth symbols are downlink symbols (in the third row);

... ; and in one slot, the first symbol is an unknown symbol, the second symbol is an uplink symbol, the third symbol is a downlink symbol, the fourth symbol is an unknown symbol, the fifth symbol is an uplink symbol, and the sixth to fourteenth symbols are downlink symbols (in the twenty-ninth row).

For example, the subcarrier spacing of the first subcarrier is 30 kHz, and it can be learned that duration of a slot is 0.5 ms. When there are two unknown symbols in the first seven symbols in one slot, two switching points exist in 0.25 ms, so that the requirement for a low latency is met. Because there is a relatively large quantity of rows in Table 2, the first row in Table 2 is used as an example to describe how to support the requirement for a low latency.

In the first row of Table 2, the first three symbols in the first seven symbols are downlink symbols. If a URLLC downlink data packet is to be received on the on the first few symbols of a slot, downlink data transmission may be performed immediately, and an ACK or a NACK may be fed back on the fifth symbols. If the data packet is transmitted incorrectly, retransmission may be performed on the sixth symbol. The entire initial transmission and retransmission may be completed within seven symbols, and take not more than 0.25 ms, thereby meeting the requirement for a latency. If an uplink data packet is to be transmitted on the first few symbols of a slot, the uplink data packet only needs to wait until the fifth symbol, to be transmitted, and a latency is far less than 0.5 ms. Therefore, a requirement of a latency of 0.5 ms can be met by using the first row in Table 2. An Analysis on another row in Table 2 is similar, and details are not described herein.

The ninth to fourteenth symbols are downlink symbols. When frequency division multiplexing is performed by using an uplink/downlink information block and an SS block, it is ensured that a symbol occupied by the SS block is a downlink symbol, to avoid that a user equipment transmits uplink information on a corresponding symbol, thereby reducing interference.

For example, the subcarrier spacing of the first subcarrier is 60 kHz, and it can be learned that duration of a slot is 0.25 ms. When there are two unknown symbols in the first seven symbols in one slot, two switching points exist in 0.125 ms, so that the requirement for a low latency is met. The ninth to fourteenth symbols are downlink symbols, so that a requirement that both the ninth to fourteenth symbols occupied by a synchronization block and the foregoing symbols are downlink symbols is met, thereby reducing interference. For a specific analysis, refer to the description of Table 1. Details are not described in this embodiment again.

In another possible implementation, as shown in Table 3, the first to sixth symbols are downlink symbols, there are one or two unknown symbols in the seventh to fourteenth symbols in the slot. Specifically as shown in Table 3, for example, there is one unknown symbol each in the sixth row and the fourteenth row, and there are two unknown symbols in each of other rows. The following uses rows as examples for description. Descriptions of other rows are similar, and details are not described in this embodiment.

As shown in Table 3, slot format information is used to indicate one or more of the following:

in one slot, the first to seventh symbols are downlink symbols, the eighth symbol is an unknown symbol, the ninth to tenth symbols are uplink symbols, and the eleventh to fourteenth symbols are downlink symbols (in the sixth row);

in one slot, the first to sixth symbols are downlink symbols, the seventh symbol is an unknown symbol, the eighth to tenth symbols are uplink symbols, and the eleventh to fourteenth symbols are downlink symbols (in the fourteenth row);

in one slot, the first to ninth symbols are downlink symbols, the tenth symbol is an unknown symbol, the eleventh symbol is an uplink symbol, the twelfth symbol is a downlink symbol, the thirteenth symbol is an unknown symbol, and the fourteenth symbol is an uplink symbol (in the first row); and in one slot, the first to eighth symbols are downlink symbols, the ninth symbol is an unknown symbol, the tenth to eleventh symbols are uplink symbols, the twelfth symbol is a downlink symbol, the thirteenth symbol is an unknown symbol, and the fourteenth symbol is an uplink symbol (in the second row).

TABLE 3

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 1  | D | D | D | D | D | D | D | D | D | G | U  | D  | G  | U  |
| 2  | D | D | D | D | D | D | D | D | G | U | U  | D  | G  | U  |
| 3  | D | D | D | D | D | D | D | D | G | U | D  | D  | G  | U  |
| 4  | D | D | D | D | D | D | D | D | G | U | D  | G  | U  | U  |
| 5  | D | D | D | D | D | D | D | G | U | U | U  | D  | G  | U  |
| 6  | D | D | D | D | D | D | D | G | U | U | D  | D  | D  | D  |
| 7  | D | D | D | D | D | D | D | G | U | U | D  | D  | G  | U  |
| 8  | D | D | D | D | D | D | D | G | U | U | D  | G  | U  | U  |
| 9  | D | D | D | D | D | D | D | G | U | D | D  | D  | G  | U  |
| 10 | D | D | D | D | D | D | D | G | U | D | D  | G  | U  | U  |
| 11 | D | D | D | D | D | D | D | G | U | D | G  | U  | U  | U  |
| 12 | D | D | D | D | D | D | D | G | U | D | G  | U  | U  | D  |
| 13 | D | D | D | D | D | D | D | G | U | D | G  | U  | D  | D  |
| 14 | D | D | D | D | D | D | G | U | U | U | D  | D  | D  | D  |
| 15 | D | D | D | D | D | D | G | U | U | U | D  | D  | G  | U  |
| 16 | D | D | D | D | D | D | G | U | U | U | D  | G  | U  | U  |
| 17 | D | D | D | D | D | D | G | U | U | U | U  | D  | G  | U  |
| 18 | D | D | D | D | D | D | G | U | U | D | D  | D  | G  | U  |
| 19 | D | D | D | D | D | D | G | U | U | D | D  | G  | U  | U  |
| 20 | D | D | D | D | D | D | G | U | U | D | G  | U  | U  | U  |
| 21 | D | D | D | D | D | D | G | U | U | D | G  | U  | U  | D  |
| 22 | D | D | D | D | D | D | G | U | U | D | G  | U  | D  | D  |
| 23 | D | D | D | D | D | D | G | U | D | D | D  | D  | G  | U  |
| 24 | D | D | D | D | D | D | G | U | D | D | D  | G  | U  | U  |
| 25 | D | D | D | D | D | D | G | U | D | D | G  | U  | U  | U  |
| 26 | D | D | D | D | D | D | G | U | D | D | G  | U  | U  | D  |
| 27 | D | D | D | D | D | D | G | U | D | D | G  | U  | D  | D  |
| 28 | D | D | D | D | D | D | G | U | D | G | U  | U  | U  | U  |
| 29 | D | D | D | D | D | D | G | U | D | G | U  | U  | U  | D  |
| 30 | D | D | D | D | D | D | G | U | D | G | U  | U  | D  | D  |
| 31 | D | D | D | D | D | D | G | U | D | G | U  | D  | D  | D  |
| 32 | D | D | D | D | D | D | G | U | D | G | U  | D  | G  | U  |

For example, the subcarrier spacing of the first subcarrier is 30 kHz, and it can be learned that to meet a requirement for a latency of 0.5 ms, two switching points needs to exist in one slot. A network device may determine, based on Table 3, a slot format in which there are two switching points in the last seven symbols, and then notify a terminal device of the slot format. Because duration of one slot in 30 kHz is 0.5 ms, when there are two unknown symbols in the last seven symbols in one slot, two switching points exist in 0.25 ms, so that the requirement for a low latency is met.

For example, in the first row in Table 3, when downlink data is to be received on the first symbol of a slot, uplink feedback needs to be performed after nine symbols, and a latency is also within 0.5 ms. If data transmission fails, retransmission may be performed within 0.5 ms, so that the requirement for a latency is met while reliability is ensured. In Table 3, descriptions of other rows corresponding to a format in which there are two switching points in the last seven symbols are similar, and details are not described herein.

The first to sixth symbols are downlink symbols in a slot. When frequency division multiplexing is performed by using an uplink/downlink information block and an SS block, it is ensured that a symbol occupied by the SS block is a downlink symbol, to avoid that a user equipment transmits uplink information on a corresponding symbol, thereby reducing interference.

For example, the subcarrier spacing of the first subcarrier is 60 kHz, and it can be learned that duration of a slot is 0.25 ms. When there are two unknown symbols in the last seven symbols in one slot, two switching points exist in 0.125 ms, so that the requirement for a low latency is met. For a specific analysis, refer to the latency analysis of each row in Table 1, and details are not described herein. When there is one unknown symbol in the last seven symbols in one slot, one switching point exists in 0.125 ms. To meet the requirement for a latency, the network device configures, in a next slot, a slot format having one switching point, so that there are two switching points in 0.5 ms, and the requirement for a latency is met.

The first to sixth symbols are downlink symbols in a slot. When frequency division multiplexing is performed by using an uplink/downlink information block and an SS block, it is ensured that a symbol occupied by the SS block is a downlink symbol, to avoid that a user equipment transmits uplink information on a corresponding symbol, thereby reducing interference.

In still another possible implementation, as shown in Table 4, there is one unknown symbol in the first to seventh symbols in one slot, and there is one unknown symbol in the eighth to fourteenth symbols. The following uses rows as examples for description. Descriptions of other rows are similar, and details are not described in this embodiment.

TABLE 4

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 1  | D | D | G | U | D | D | D | D | D | D | D  | D  | G  | U  |
| 2  | D | G | U | D | D | D | D | D | D | D | D  | D  | G  | U  |
| 3  | D | G | U | U | D | D | D | D | D | D | D  | D  | G  | U  |
| 4  | U | D | G | U | D | D | D | D | D | D | D  | D  | G  | U  |
| 5  | U | D | G | U | D | D | D | D | D | D | D  | D  | D  | G  |
| 6  | U | U | D | D | D | D | D | D | D | D | G  | U  | D  | G  |
| 7  | G | U | D | D | D | D | D | D | D | D | D  | G  | U  | D  |
| 8  | D | D | D | D | D | D | G | U | D | D | D  | D  | G  | U  |
| 9  | U | U | D | D | D | D | G | U | D | D | D  | D  | D  | G  |
| 10 | U | U | D | D | D | D | G | U | D | D | D  | D  | G  | U  |

As shown in Table 4, slot format information is used to indicate one or more of the following:

in one slot, the first and second symbols are uplink symbols, the third symbol is an unknown symbol, the fourth symbol is an uplink symbol, the fifth to twelfth symbols are downlink symbols, the thirteenth symbol is an unknown symbol, and the fourteenth symbol is an uplink symbol (in the first row); and in one slot, the first symbol is a downlink symbol, the second symbol is an unknown symbol, the third symbol is an uplink symbol, the fourth to twelfth symbols are downlink symbols, the thirteenth symbol is an unknown symbol, and the fourteenth symbol is an uplink symbol (in the second row).

For example, the subcarrier spacing of the first subcarrier is 30 kHz, and it can be learned that duration of a slot is 0.5 ms. When there is one unknown symbol in the first to seventh symbols in one slot, and there is one unknown symbol in the eighth to fourteenth symbols, two switching points exist in 0.5 ms, so that the requirement for a low latency is met.

In Table 4, the first seven symbols and the last seven symbols each have one switching point, so that a latency of data transmission on any symbol can be relatively small. The first row in Table 4 is used as an example. When a downlink data packet is to be received on a start symbol in one slot, data transmission may be performed immediately, and a corresponding ACK or NACK may be sent to a network device on the fourth symbol. If downlink data is to be received on the fourth symbol, the downlink data only needs to wait for one symbol, for transmission at the fifth symbol, and a corresponding uplink feedback may be performed on the fourteenth symbol. Regardless of a symbol on which to-be-received data is, a latency does not exceed 0.5 ms. In addition, there are two switching points in one slot, that is, retransmission may be performed within 0.5 ms, which can ensure reliability. When frequency division multiplexing is performed by using an uplink/downlink information block and an SS block, it is ensured that a symbol occupied by the SS block is a downlink symbol, to avoid that a user equipment transmits uplink information on a corresponding symbol. In addition, there are at least four consecutive downlink symbols in one slot, so that a requirement that both the ninth to fourteenth symbols occupied by a synchronization block and the synchronization block are downlink is met, thereby reducing interference.

For example, the subcarrier spacing of the first subcarrier is 60 kHz, and it can be learned that duration of a slot is 0.25 ms. When there is one unknown symbol in the first to seventh symbols in one slot, and there is one unknown symbol in the eighth to fourteenth symbols, two switching points exist in 0.25 ms, so that the requirement for a low latency is met. For a specific latency analysis, refer to the latency analyses of Table 1, Table 2, and Table 3 based on a subcarrier spacing of 60 kHz. It can be learned that using a slot format in Table 4 can meet the requirement for a low latency while ensuring reliability. In addition, there are at least four consecutive downlink symbols in one slot. When frequency division multiplexing is performed by using an uplink/downlink information block and an SS block, it is ensured that a symbol occupied by the SS block is a downlink symbol, to avoid that a user equipment transmits uplink information on a corresponding symbol, thereby reducing interference.

Solution 3

In 14 symbols corresponding to one slot, the first eight symbols start with one or more downlink symbols, and end with one or more uplink symbols, there is at least one unknown symbol between the downlink symbol and the uplink symbol, and the ninth to fourteenth symbols are downlink symbols. The unknown symbol may be represented by a letter "X", or may be represented by a letter "G".

For ease of description, specific implementation of an uplink-downlink configuration is described in detail with reference to a table in this embodiment.

In a possible implementation, a slot format information table in this solution may include one or more rows in Table 5.

The slot format information table includes a first slot format, and the first slot format satisfies: the first to eighth symbols start with one or more consecutive downlink symbols, and end with one or more consecutive uplink symbols, there is at least one unknown symbol between the last downlink symbol in the one or more consecutive downlink symbols and the first uplink symbol in the one or more consecutive uplink symbols, and the ninth to fourteenth symbols are downlink symbols.

For example, for the sixth row and the seventh row, there is one unknown symbol between the last downlink symbol in one or more consecutive downlink symbols and the first uplink symbol in one or more consecutive uplink symbols. In some other rows, for example, the first row to the fifth row, there are two or more unknown symbols between the last downlink symbol in one or more consecutive downlink symbols and the first uplink symbol in one or more consecutive uplink symbols.

For another example, in the ninth row, a first slot format is represented as DDXXXUUUDDDDDD, D represents a downlink symbol, U represents an uplink symbol, and X represents an unknown symbol. Descriptions of other rows are similar, and details are not described in this embodiment.

TABLE 5

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 1  | D | X | X | X | X | X | X | U | D | D | D  | D  | D  | D  |
| 2  | D | X | X | X | X | X | U | U | D | D | D  | D  | D  | D  |
| 3  | D | X | X | X | X | U | U | U | D | D | D  | D  | D  | D  |
| 4  | D | X | X | X | U | U | U | U | D | D | D  | D  | D  | D  |
| 5  | D | X | X | U | U | U | U | U | D | D | D  | D  | D  | D  |
| 6  | D | X | U | U | U | U | U | U | D | D | D  | D  | D  | D  |
| 7  | D | D | X | X | X | X | X | U | D | D | D  | D  | D  | D  |
| 8  | D | D | X | X | X | X | U | U | D | D | D  | D  | D  | D  |
| 9  | D | D | X | X | X | U | U | U | D | D | D  | D  | D  | D  |
| 10 | D | D | X | X | U | U | U | U | D | D | D  | D  | D  | D  |
| 11 | D | D | X | U | U | U | U | U | D | D | D  | D  | D  | D  |
| 12 | D | D | D | X | X | X | X | U | D | D | D  | D  | D  | D  |
| 13 | D | D | D | X | X | X | U | U | D | D | D  | D  | D  | D  |
| 14 | D | D | D | X | X | U | U | U | D | D | D  | D  | D  | D  |
| 15 | D | D | D | X | U | U | U | U | D | D | D  | D  | D  | D  |
| 16 | D | D | D | D | X | X | X | U | D | D | D  | D  | D  | D  |
| 17 | D | D | D | D | X | X | U | U | D | D | D  | D  | D  | D  |
| 18 | D | D | D | D | X | U | U | U | D | D | D  | D  | D  | D  |
| 19 | D | D | D | D | X | X | U | D | D | D | D  | D  | D  | D  |
| 20 | D | D | D | D | D | X | U | U | D | D | D  | D  | D  | D  |
| 21 | D | D | D | D | D | X | U | U | D | D | D  | D  | D  | D  |
| 22 | D | X | X | X | X | X | U | D | D | D | D  | D  | D  | D  |
| 23 | D | X | X | X | X | U | D | D | D | D | D  | D  | D  | D  |
| 24 | D | X | X | X | U | D | D | D | D | D | D  | D  | D  | D  |
| 25 | D | X | X | U | D | D | D | D | D | D | D  | D  | D  | D  |
| 26 | D | X | U | D | D | D | D | D | D | D | D  | D  | D  | D  |
| 27 | D | X | X | X | U | U | D | D | D | D | D  | D  | D  | D  |
| 28 | D | X | X | U | U | D | D | D | D | D | D  | D  | D  | D  |
| 29 | D | X | X | U | D | D | D | D | D | D | D  | D  | D  | D  |
| 30 | D | X | U | U | D | D | D | D | D | D | D  | D  | D  | D  |
| 31 | D | X | X | U | U | D | D | D | D | D | D  | D  | D  | D  |
| 32 | D | X | X | U | U | D | D | D | D | D | D  | D  | D  | D  |
| 33 | D | X | U | U | U | D | D | D | D | D | D  | D  | D  | D  |
| 34 | D | X | X | U | U | U | D | D | D | D | D  | D  | D  | D  |
| 35 | D | X | U | U | U | D | D | D | D | D | D  | D  | D  | D  |
| 36 | D | X | U | U | U | U | D | D | D | D | D  | D  | D  | D  |
| 37 | D | D | X | X | X | X | U | D | D | D | D  | D  | D  | D  |
| 38 | D | D | X | X | X | U | D | D | D | D | D  | D  | D  | D  |
| 39 | D | D | X | X | U | D | D | D | D | D | D  | D  | D  | D  |
| 40 | D | D | X | U | D | D | D | D | D | D | D  | D  | D  | D  |
| 41 | D | D | X | X | X | U | U | D | D | D | D  | D  | D  | D  |
| 42 | D | D | X | X | U | U | D | D | D | D | D  | D  | D  | D  |
| 43 | D | D | X | U | U | D | D | D | D | D | D  | D  | D  | D  |
| 44 | D | D | X | X | U | U | U | D | D | D | D  | D  | D  | D  |
| 45 | D | D | X | U | U | U | D | D | D | D | D  | D  | D  | D  |
| 46 | D | D | X | U | U | U | U | D | D | D | D  | D  | D  | D  |
| 47 | D | D | D | X | X | X | U | D | D | D | D  | D  | D  | D  |
| 48 | D | D | D | X | X | U | D | D | D | D | D  | D  | D  | D  |
| 49 | D | D | D | X | U | D | D | D | D | D | D  | D  | D  | D  |
| 50 | D | D | D | X | X | U | U | D | D | D | D  | D  | D  | D  |
| 51 | D | D | D | X | U | U | D | D | D | D | D  | D  | D  | D  |
| 52 | D | D | D | X | U | U | U | D | D | D | D  | D  | D  | D  |
| 53 | D | D | D | D | X | X | U | D | D | D | D  | D  | D  | D  |
| 54 | D | D | D | D | X | U | D | D | D | D | D  | D  | D  | D  |
| 55 | D | D | D | D | X | U | U | D | D | D | D  | D  | D  | D  |
| 56 | D | D | D | D | D | X | U | D | D | D | D  | D  | D  | D  |

As shown in Table 5, one row in Table 5 indicates 14 symbols in one slot. D represents a downlink symbol, X represents an unknown symbol, and U represents an uplink symbol. The downlink symbol, the uplink symbol, and the unknown symbol may be further represented by other letters. For example, the unknown symbol may be denoted as Un. The leftmost column in Table 5 indicates sequence numbers of rows, and the top row in Table 5 indicates sequence numbers of symbols. The sequence numbers of the symbols in this embodiment start with 0 and end with 13, and the sequence numbers of the symbols may alternatively start with 1 and end with 14. A method for numbering the symbols is not specifically limited in this embodiment.

As shown in Table 5, slot format information is used to indicate one or more slot formats in a table slot format information table, and the slot format information table may include one or more rows in Table 5.

For a network device and a terminal device, the slot format information table may be known and prestored. When the slot format information is a slot format index, the slot format index is used to indicate a row in the slot format information table. For example, the slot format index may indicate a sequence number of a row. For example, if the index is binary, when the index is 001, the first row may be indicated; when the index is 010, the second row may be indicated; when the index is 011, the third row may be indicated; and so on. Sequence numbers of rows may alternatively start with 0.

In another possible implementation, a slot format information table in this solution may include one or more rows in Table 2.

The slot format information table includes a first slot format, and the first slot format satisfies: the first to eighth symbols start with one or more consecutive downlink symbols, and end with one or more consecutive uplink symbols, there are two unknown symbols between the last downlink symbol in the one or more consecutive downlink symbols and the first uplink symbol in the one or more consecutive uplink symbols, and the ninth to fourteenth symbols are downlink symbols.

As shown in Table 2, there are two unknown symbols between the last downlink symbol in one or more consecutive downlink symbols and the first uplink symbol in one or more consecutive uplink symbols in the first to eleventh rows in Table 2.

A slot format information table in an actual application needs to meet not only a requirement of a low latency service, but also requirements of another type of service and another type of feature. Therefore, the slot format information table in an actual application may include one or more rows, or all rows in Table 5. A base station may properly select some rows in the table to configure a slot format, according to a scheduling algorithm and/or based on a requirement of the terminal device. Specific rows, in Table 5, selected for the table in an actual application are not specifically limited in this embodiment. In a specific implementation process, the network device may determine the slot format information from the table in an actual application, to meet a requirement of reducing interference and a requirement of a low latency. For a selection rule or a selection algorithm of the network device, details are not described in this embodiment.

According to the method described in Solution 3, when the subcarrier spacing used for data transmission is 60 kHz, duration of a slot is 0.25 ms. If one switching point is ensured in one slot, two switching points within 0.5 ms can be implemented, which can meet a requirement of a low latency service. In addition, in the table shown in Table 5, there are a plurality of unknown symbols in the first eight symbols in most slot formats. In this way, there may be sufficient time for a user equipment to switch from downlink to uplink, thereby reducing a requirement on the user equipment.

Solution 4

In 14 symbols corresponding to one slot, there are two downlink-uplink switching points in the first six symbols. For each downlink-uplink switching point, there is at least one unknown symbol between a downlink symbol and an uplink symbol. The seventh symbol is an uplink symbol, the eighth symbol is a downlink symbol, and the ninth to fourteenth symbols are downlink symbols.

For ease of description, specific implementation of the uplink-downlink configuration is described in detail with reference to a table in this embodiment. A slot format information table in this solution may include one or more rows in Table 6.

The unknown symbol may be represented by "X", or "G", or any other letter representing a flexible symbol or an unknown symbol.

TABLE 6

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 1  | D | X | U | D | X | X | U | D | D | D | D  | D  | D  | D  |
| 2  | D | X | U | U | D | X | U | D | D | D | D  | D  | D  | D  |
| 3  | D | X | X | U | D | X | U | D | D | D | D  | D  | D  | D  |
| 4  | X | U | U | D | X | X | U | D | D | D | D  | D  | D  | D  |
| 5  | X | U | U | D | D | X | U | D | D | D | D  | D  | D  | D  |
| 6  | X | U | U | U | D | X | U | D | D | D | D  | D  | D  | D  |
| 7  | X | X | U | D | X | X | U | D | D | D | D  | D  | D  | D  |
| 8  | X | X | U | D | D | X | U | D | D | D | D  | D  | D  | D  |
| 9  | X | X | U | U | D | X | U | D | D | D | D  | D  | D  | D  |
| 10 | X | X | X | U | D | X | U | D | D | D | D  | D  | D  | D  |

As shown in Table 6, one row in Table 6 indicates 14 symbols in one slot. D represents a downlink symbol, X represents an unknown symbol, and U represents an uplink symbol. The downlink symbol, the uplink symbol, and the unknown symbol may be further represented by other letters. For example, the unknown symbol may be denoted as Un. The leftmost column in Table 6 indicates sequence numbers of rows, and the top row in Table 6 indicates sequence numbers of symbols. The sequence numbers of the symbols in this embodiment start with 0 and end with 13, and the sequence numbers of the symbols may alternatively start with 1 and end with 14. A method for numbering the symbols is not specifically limited in this embodiment.

As shown in Table 6, slot format information is used to indicate one or more slot formats in a slot format information table, and the slot format information table may include one or more rows in Table 6.

For a network device and a terminal device, the slot format information table may be known and prestored. When the slot format information is a slot format index, the slot format index is used to indicate a row in the slot format information table. For example, the slot format index may indicate a sequence number of a row. For example, if the index is binary, when the index is 001, the first row may be indicated; when the index is 010, the second row may be indicated; when the index is 011, the third row may be indicated; and so on. Sequence numbers of rows may alternatively start with 0.

A slot format information table in an actual application needs to meet not only a requirement of a low latency service, but also requirements of another type of service and another type of feature. Therefore, the slot format information table in an actual application may include one or more rows, or all rows in Table 6. A base station may properly select some rows in the table to configure a slot format, according to a scheduling algorithm and/or based on a requirement of the terminal device. Specific rows, in Table 6, selected for the table in an actual application are not specifically limited in this embodiment. In a specific implementation process, the network device may determine the slot format information from the table in an actual application, to meet a requirement of reducing interference and a requirement of a low latency. For a selection rule or a selection algorithm of the network device, details are not described in this embodiment.

The unknown symbol in this embodiment of this application may be a symbol whose direction has not been determined to uplink or downlink in a slot, or may be a reserved symbol, or may be one or more symbols that may be overwritten to a symbol in an uplink direction or a downlink direction in a slot by transmission with a higher priority such as indication information with a higher priority or transmission information with a higher priority (for example, downlink data information or uplink data information), or may be used as a time interval for uplink/downlink switching, or may be referred to as a flexible symbol. This is not limited in this embodiment of this application.

According to the method described in Solution 4, when the subcarrier spacing of the first subcarrier is 60 kHz, duration of a slot is 0.25 ms. When there are two unknown symbols in the last seven symbols in one slot, two switching points exist in 0.125 ms, so that the requirement for a low latency is met. In addition, in the table shown in Table 6, switching points in most slot formats include a plurality of unknown symbols. In this way, there may be sufficient time for a user equipment to switch from downlink to uplink, thereby reducing a requirement on user equipment.

The foregoing table is described by using rows as examples. A table in an actual application may be implemented by using a column, or may be implemented by both a row and a column, or may be implemented by using a table in another form, provided that the table can describe a specific format of 14 symbols in a slot and a position of each symbol. A specific implementation form is not limited in this embodiment.

Table 2, Table 3, Table 4, Table 5, and Table 6 may be used as different tables, or may be combined into one table for use. Alternatively, a table in an actual application may be a table selected from the foregoing tables. For example, the table in an actual application may include at least one of the following:

one or more rows, or all rows in Table 2;
one or more rows, or all rows in Table 3;
one or more rows, or all rows in Table 4;
one or more rows, or all rows in Table 5; and
one or more rows, or all rows in Table 6.

Specific rows, in Table 2, Table 3, Table 4, Table 5, and Table 6, selected for the table in an actual application are not specifically limited in this embodiment. In a specific implementation process, the network device may determine the slot format information from the table in an actual application, to meet a requirement of reducing interference and a requirement of a low latency. For a selection rule or a selection algorithm of the network device, details are not described in this embodiment.

Correspondingly, when the slot format information is a slot format index, the index is used to indicate a sequence number of each row in each table. Sequence numbers of rows in each table may start with 1, as the leftmost columns in Table 2, Table 3, Table 4, Table 5, and Table 6 show. The tables may be used as different tables, and rows in each table may be consecutively numbered; or the tables may be combined into one table, and rows in the large table may be consecutively numbered. For example, Table 2, Table 3, and Table 4 are combined into one large table, sequence numbers of rows in the large table start with 1 and end with 72. The sequence numbers of the rows in each table may alternatively start with 0. This embodiment imposes no special limitation on a specific implementation of numbering.

Further, in the table in an actual application, rows may be selected from Table 1 to Table 6, and then form a new table, or Table 1 to Table 6 are combined into one large table. Alternatively, the table in an actual application may further include another row while including rows in Table 1 to Table 6. Provided that the table in an actual application includes slot formats indicated by the rows in Table 1 to Table 6 in this embodiment, the table in an actual application falls within the protection scope of this application.

It may be understood that in the foregoing embodiments, the method or steps implemented by the terminal device may be alternatively implemented by a chip inside the terminal device. The method or steps implemented by the network device may be alternatively implemented by a chip inside the network device.

Figure 6:
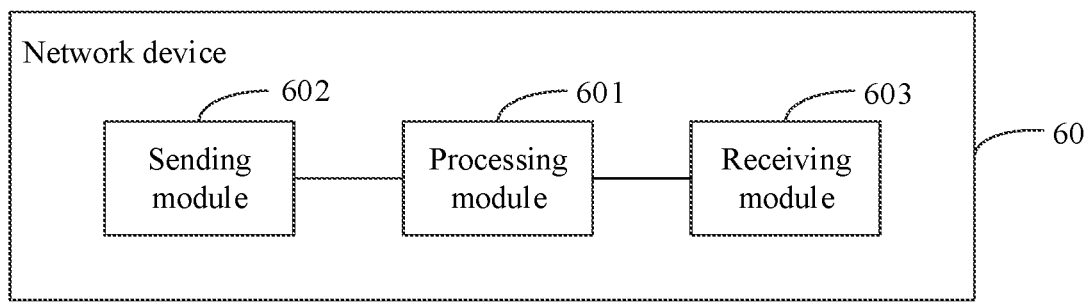
FIG. 6 is a simplified structural diagram of a network device according to an embodiment of this application.
Figure 7:
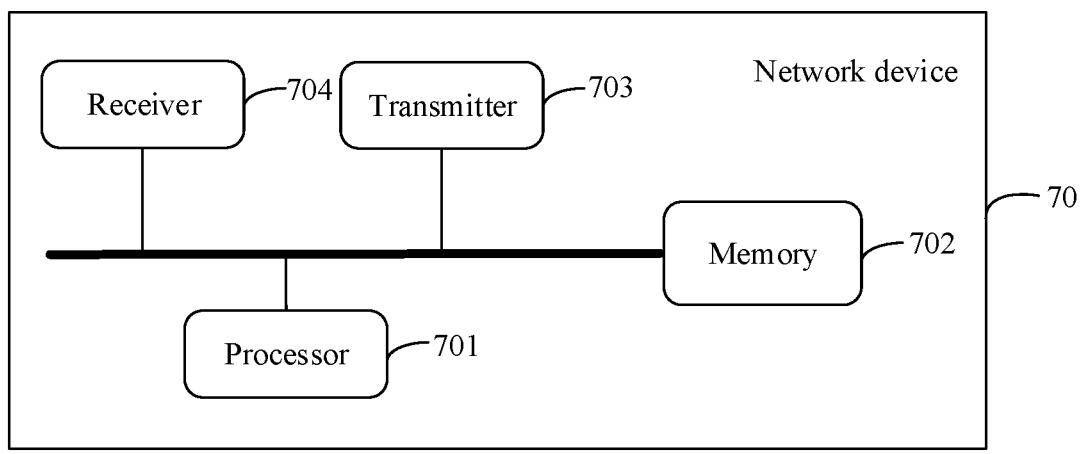
FIG. 7 is a simplified hardware diagram of a network device according to an embodiment of this application.

When an information transmission device is a network device, a structure of the network device may be shown in FIG. 6 and FIG. 7. When the information transmission device is a terminal device, a structure of the terminal device may be shown in FIG. 8 and FIG. 9.

FIG. 6 is a schematic structural diagram of a network device 60 according to an embodiment of this application. As shown in FIG. 6, the network device 60 includes a processing module 601 and a sending module 602. Optionally, the network device 60 further includes a receiving module 603.

The processing module 601 is configured to determine slot format information, where the slot format information is used to indicate positions of uplink symbols, positions of downlink symbols, and positions of unknown symbols in a slot.

The sending module 602 is configured to send the slot format information.

Optionally, the sending module 602 is specifically configured to:

send downlink control information, where the downlink control information carries the slot format information; or send higher layer signaling, where the higher layer signaling carries the slot format information.

Optionally, the receiving module 603 is configured to receive latency requirement information of at least one terminal device from the at least one terminal device before the slot format information is determined.

The information transmission device provided in this embodiment may be configured to perform the technical solution performed by the network device or the chip of the network device in the foregoing method embodiments. An implementation principle and a technical effect of the information transmission device are similar to the network device or the chip of the network device in the foregoing method embodiments. For functions of each module, refer to the corresponding description in the method embodiments, and details are not described herein.

The processing module 601 may be further implemented as a processor, and the processor may execute an executable instruction stored in a memory, to implement the foregoing method. Details may be shown in FIG. 7.

FIG. 7 is a structural diagram of hardware of a network device 70 according to an embodiment of this application. As shown in FIG. 7, the network device 70 includes a processor 701 and a memory 702.

The memory 702 is configured to store a computer program, and the memory may further be a flash memory.

The processor 701 is configured to execute an executable instruction stored in the memory 702, to implement steps performed by the network device in the foregoing information transmission method. For details, refer to related descriptions in the foregoing method embodiments.

The memory 702 may be independent, or may be integrated with the processor 701.

Optionally, the network device 70 further includes a transmitter 703 and a receiver 704.

Specifically, the processor 701 is configured to determine slot format information, where the slot format information is used to indicate positions of uplink symbols, positions of downlink symbols, and positions of unknown symbols in a slot; and the transmitter 703 is configured to send the slot format information.

Optionally, the transmitter 703 is specifically configured to:

send downlink control information, where the downlink control information carries the slot format information; or send higher layer signaling, where the higher layer signaling carries the slot format information.

Optionally, the receiver 704 is configured to receive latency requirement information of at least one terminal device from the at least one terminal device before the slot format information is determined.

The network device provided in this embodiment may be configured to perform the technical solution performed by the network device in the foregoing method embodiments. An implementation principle and a technical effect of the network device are similar to the network device in the foregoing method embodiments, and reference may be made to the corresponding description in the method embodiments. Details are not described herein.

Figure 8:
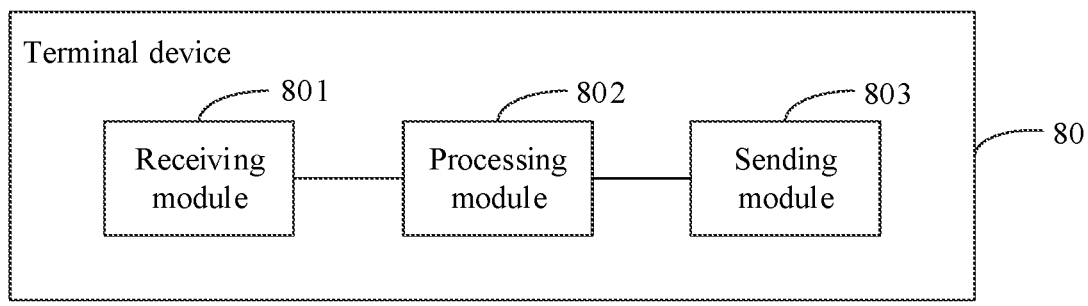
FIG. 8 is a simplified structural diagram of a terminal device according to an embodiment of this application.

FIG. 8 is a schematic structural diagram of a terminal device according to an embodiment of this application. As shown in FIG. 8, the terminal device 80 includes a receiving module 801, a processing module 802, and a sending module 803.

The receiving module 801 is configured to receive slot format information from a network device, where the slot format information is used to indicate positions of uplink symbols, positions of downlink symbols, and positions of unknown symbols in a slot.

The processing module 802 is configured to determine a slot format based on the slot format information.

Optionally, the receiving module 801 is specifically configured to:

receive downlink control information from the network device, where the downlink control information carries the slot format information; or receive higher layer signaling from the network device, where the higher layer signaling carries the slot format information.

Optionally, the sending module 803 is configured to send latency requirement information to the network device before the slot format information is received from the network device.

The information transmission device provided in this embodiment may be configured to perform the technical solution performed by the terminal device or the chip of the terminal device in the foregoing method embodiments. An implementation principle and a technical effect of the information transmission device are similar to the terminal device or the chip of the terminal device in the foregoing method embodiments. For functions of each module, refer to the corresponding description in the method embodiments, and details are not described herein.

The processing module 802 may be further implemented as a processor, and the processor may execute an executable instruction stored in a memory, to implement the foregoing method. Details may be shown in FIG. 9.

Figure 9:
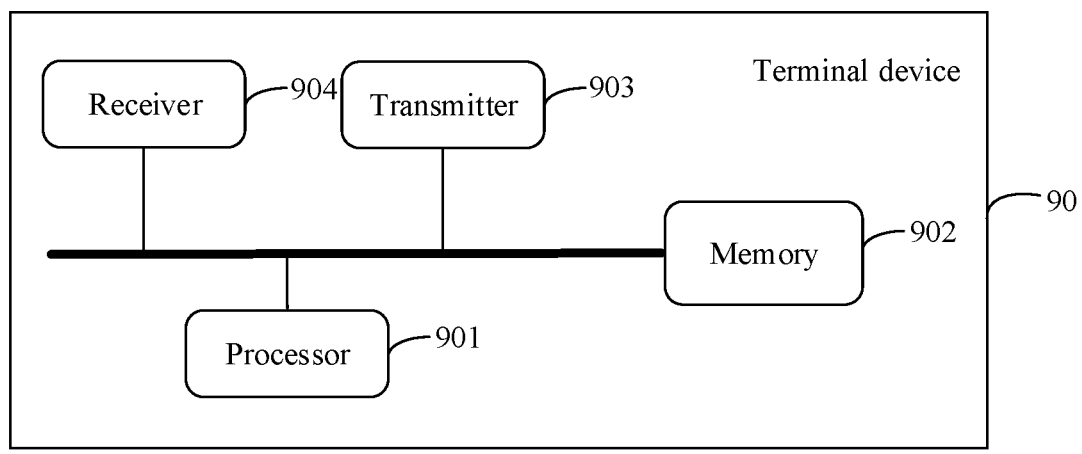
FIG. 9 is a simplified hardware diagram of a terminal device according to an embodiment of this application.

FIG. 9 is a structural diagram of hardware of a terminal device 90 according to an embodiment of this application. As shown in FIG. 9, the terminal device 90 includes a processor 901 and a memory 902.

The memory 902 is configured to store a computer program, and the memory may further be a flash memory.

The processor 901 is configured to execute an executable instruction stored in the memory 902, to implement steps performed by the terminal device in the foregoing information transmission method. For details, refer to related descriptions in the foregoing method embodiments.

The memory 902 may be independent, or may be integrated with the processor 901.

Optionally, the terminal device 90 further includes a transmitter 903 and a receiver 904.

Specifically, the receiver 904 is configured to receive slot format information from a network device, where the slot format information is used to indicate positions of uplink symbols, positions of downlink symbols, and positions of unknown symbols in a slot.

The processor 901 is configured to determine a slot format based on the slot format information.

Optionally, the receiver 904 is specifically configured to:

receive downlink control information from the network device, where the downlink control information carries the slot format information; or receive higher layer signaling from the network device, where the higher layer signaling carries the slot format information.

Optionally, the transmitter 903 is configured to send latency requirement information to the network device before the slot format information is received from the network device.

The terminal device provided in this embodiment may be configured to perform the technical solution performed by the terminal device in the foregoing method embodiments. An implementation principle and a technical effect of the terminal device are similar to the terminal device in the foregoing method embodiments, and reference may be made to the corresponding description in the method embodiments. Details are not described herein.

In the embodiments shown in FIG. 6 to FIG. 9, optionally, the slot format information is a slot format index, and the slot format index is used to indicate a row in a slot format information table.

Each row in the slot format information table is used to indicate positions of uplink symbols, positions of downlink symbols, and positions of unknown symbols in one or more slots.

Optionally, the slot format information corresponds to the slot format information table, the slot format information table includes a first slot format, and the first slot format satisfies: the first to eighth symbols start with one or more downlink symbols, and end with one or more uplink symbols, there is at least one unknown symbol between the downlink symbol and the uplink symbol, and the ninth to fourteenth symbols are downlink symbols.

Optionally, the first slot format is represented as DDXXXUUUDDDDDD, D represents a downlink symbol, U represents an uplink symbol, and X represents an unknown symbol.

Optionally, the slot format information table is prestored.

Optionally, there are two unknown symbols in the first six symbols in the slot;

the seventh symbol in the slot is an uplink symbol; and the eighth symbol in the slot is a downlink symbol.

Optionally, the ninth to fourteenth symbols in the slot are downlink symbols.

Optionally, in the slot, the first symbol is a downlink symbol, the second symbol is an unknown symbol, the third symbol is an uplink symbol, the fourth symbol is a downlink symbol, the fifth symbol is an unknown symbol, and the sixth symbol is an uplink symbol; or in the slot, the first symbol is a downlink symbol, the second symbol is a downlink symbol, the third symbol is an unknown symbol, the fourth symbol is an uplink symbol, the fifth symbol is a downlink symbol, and the sixth symbol is an unknown symbol; or in the slot, the first symbol is a downlink symbol, the second symbol is an unknown symbol, the third symbol is an uplink symbol, the fourth symbol is a downlink symbol, the fifth symbol is a downlink symbol, and the sixth symbol is an unknown symbol; or in the slot, the first symbol is an unknown symbol, the second symbol is an uplink symbol, the third symbol is an uplink symbol, the fourth symbol is a downlink symbol, the fifth symbol is an unknown symbol, and the sixth symbol is an uplink symbol; or in the slot, the first symbol is an unknown symbol, the second symbol is an uplink symbol, the third symbol is a downlink symbol, the fourth symbol is a downlink symbol, the fifth symbol is an unknown symbol, and the sixth symbol is an uplink symbol; or in the slot, the first symbol is an unknown symbol, the second symbol is an uplink symbol, the third symbol is a downlink symbol, the fourth symbol is an unknown symbol, the fifth symbol is an uplink symbol, and the sixth symbol is an uplink symbol.

Optionally, there are two unknown symbols in the first to seventh symbols in the slot, and the ninth to fourteenth symbols in the slot are downlink symbols; or the first to sixth symbols in the slot are downlink symbols, and there are one or two unknown symbols in the seventh to fourteenth symbols in the slot; or there is one unknown symbol in the first to seventh symbols in the slot, and there is one unknown symbol in the eighth to fourteenth symbols in the slot.

Optionally, a first subcarrier is used to transmit uplink information carried on the uplink symbol and downlink information carried on the downlink symbol; and a subcarrier spacing of the first subcarrier is greater than or equal to a subcarrier spacing of a second subcarrier, and the second subcarrier is used to transmit a synchronization block sent by the network device.

Optionally, the unknown symbol is a flexible symbol.

According to an embodiment of this application, a computer storage medium is further provided. The storage medium includes an instruction, and when the instruction is executed by a computer, the computer is enabled to implement the forgoing information transmission method performed by the network device.

According to an embodiment of this application, a computer storage medium is further provided. The storage medium includes an instruction, and when the instruction is executed by a computer, the computer is enabled to implement the foregoing information transmission method performed by the terminal device.

According to an embodiment of this application, a chip is further provided, including a memory and a processor.

The memory is configured to store a program instruction.

The processor is configured to invoke the program instruction stored in the memory to implement the foregoing information transmission method performed by the network device.

According to an embodiment of this application, a chip is further provided, including a memory and a processor.

The memory is configured to store a program instruction.

The processor is configured to invoke the program instruction stored in the memory to implement the foregoing information transmission method performed by the terminal device.

According to an embodiment of this application, a program product is further provided. The program product includes a computer program, the computer program is stored in a readable storage medium, and at least one processor of a network device may read the computer program from the readable storage medium. The at least one processor executes the computer program, so that the network device performs the foregoing information transmission method.

According to an embodiment of this application, a program product is further provided. The program product includes a computer program, the computer program is stored in a readable storage medium, and at least one processor of a terminal device may read the computer program from the readable storage medium. The at least one processor executes the computer program, so that the terminal device performs the foregoing information transmission method.

According to an embodiment of this application, a communications apparatus is further provided, including a processor and a communications interface. The processor is configured to support the communications apparatus in performing the information transmission method performed by the network device, and the communications interface is configured to support communication between the communications apparatus and another communications device.

According to an embodiment of this application, a communications apparatus is further provided, including a processor and a communications interface. The processor is configured to support the communications apparatus in performing the information transmission method performed by the terminal device, and the communications interface is configured to support communication between the communications apparatus and another communications device.

It should be understood that in the foregoing network device or terminal device embodiments, the processor may be a central processing unit (CPU), or may be another general-purpose processor, a digital signal processor (DSP), an application-specific integrated circuit (ASIC), or the like. The general-purpose processor may be a microprocessor, or the processor may be alternatively any conventional processor or the like. The steps of the methods disclosed with reference to this application may be directly implemented by a hardware processor, or may be implemented by a combination of hardware and a software module in the processor.

The foregoing memory (storage medium) includes a read-only memory (ROM), a RAM, a flash memory, a hard disk, a solid-state drive, a magnetic tape, a floppy disk, an optical disc, and any combination thereof.

What is claimed is:

1. A method performed by a communication apparatus, comprising:

determining a slot format index, wherein the slot format index corresponds to a row in a slot format information table, and wherein each row in the slot format information table comprises positions, within a slot, of: uplink symbols, downlink symbols, and unknown symbols; and sending the slot format index to a terminal device, wherein the slot format index corresponds to a row in the slot format information table that comprises a slot format of:

DDXXXUUUDDDDDD, where:

D represents a downlink symbol,

U represents an uplink symbol, and

X represents an unknown symbol.

2. The method according to claim 1, wherein the slot format index is carried in downlink control information or higher layer signaling sent to the terminal device.

3. The method according to claim 1, wherein an unknown symbol is a flexible symbol.

4. The method according to claim 1, wherein a first subcarrier is used to transmit uplink information carried on the uplink symbol or used to transmit downlink information carried on the downlink symbol, and a second subcarrier is used to transmit a synchronization block, wherein a subcarrier spacing of the first subcarrier is greater than a subcarrier spacing of the second subcarrier.

5. A method performed by a communication apparatus, comprising:

receiving a slot format index from a network device, wherein the slot format index corresponds to a row in a slot format information table, and wherein each row in the slot format information table comprises positions, within a slot, of: uplink symbols, downlink symbols, and unknown symbols; and determining a slot format from the slot format information table based on the slot format index,
wherein the slot format index corresponds to a row in the slot format information table that comprises a slot format of:
DDXXXUUUDDDDDD,
where:
D represents a downlink symbol,
U represents an uplink symbol, and
X represents an unknown symbol.

6. The method according to claim 5, wherein the slot format index is carried in downlink control information or higher layer signaling received from the network device.

7. The method according to claim 5, wherein the slot format information table is prestored in the terminal device.

8. The method according to claim 5, wherein a first subcarrier is used to transmit uplink information carried on the uplink symbol or used to transmit downlink information carried on the downlink symbol, and a second subcarrier is used to transmit a synchronization block, wherein a subcarrier spacing of the first subcarrier is greater than a subcarrier spacing of the second subcarrier.

9. A communication apparatus, comprising:
a processor,
a memory, and
a communication interface;
wherein the memory comprises computer-executable instructions that, when executed by the processor, cause the communication apparatus to carry out a method comprising:
determining a slot format index for uplink-downlink transmission, wherein the slot format index corresponds to a row in a slot format information table, and wherein each row in the slot format information table comprises positions, within a slot, of uplink symbols, downlink symbols, and unknown symbols; and
sending the slot format index to a terminal device through the communication interface,
wherein the slot format index corresponds to a row in the slot format information table that comprises a slot format of:
DDXXXUUUDDDDDD,
where:
D represents a downlink symbol,
U represents an uplink symbol, and
X represents an unknown symbol.

10. The apparatus according to claim 9, wherein the slot format index is carried in downlink control information or higher layer signaling sent to the terminal device.

11. The apparatus according to claim 9, wherein an unknown symbol is a flexible symbol.

12. The apparatus according to claim 9, wherein a first subcarrier is used to transmit uplink information carried on the uplink symbol or used to transmit downlink information carried on the downlink symbol, and a second subcarrier is used to transmit a synchronization block, wherein a subcarrier spacing of the first subcarrier is greater than a subcarrier spacing of the second subcarrier.

13. A communication apparatus, comprising:
a processor,
a memory,. and
a communication interface;
wherein the memory comprises computer-executable instructions that, when executed by the processor, cause the communication apparatus to carry out a method comprising:
receiving a slot format index from a network device through the communication interface, wherein the slot format index corresponds to a row in a slot format information table, and wherein each row in the slot format information table comprises positions, within a slot, of:
uplink symbols, downlink symbols, and unknown symbols; and
determining a slot format for uplink-downlink transmission from the slot format information table based on the slot format index,
wherein the slot format index corresponds to a row in the slot format information table that comprises a slot format of:
DDXXXUUUDDDDDD,
where:
D represents a downlink symbol,
U represents an uplink symbol, and
X represents an unknown symbol.

14. The apparatus according to claim 13, wherein the slot format index is carried in downlink control information or higher layer signaling sent by the network device.

15. The apparatus according to claim 13, further comprising a storage unit configured to prestore the slot format information table.

16. The apparatus according to claim 13, wherein a first subcarrier is used to transmit uplink information carried on the uplink symbol or used to transmit downlink information carried on the downlink symbol, and a second subcarrier is used to transmit a synchronization block, wherein a subcarrier spacing of the first subcarrier is greater than a subcarrier spacing of the second subcarrier.

* * * * *

UNITED STATES PATENT AND TRADEMARK OFFICE
CERTIFICATE OF CORRECTION

PATENT NO. : 11,239,938 B2  
APPLICATION NO. : 15/931571  
DATED : February 1, 2022  
INVENTOR(S) : Ma et al.

Page 1 of 1

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this  
Seventh Day of June, 2022

Katherine Kelly Vidal  
*Director of the United States Patent and Trademark Office*